(12) United States Patent
Yubuta et al.

(10) Patent No.: US 7,828,999 B2
(45) Date of Patent: Nov. 9, 2010

(54) PROCESS AND APPARATUS FOR PRODUCING FINE PARTICLES

(75) Inventors: Kazuhiro Yubuta, Saitama (JP);
Keitaroh Nakamura, Saitama (JP);
Takashi Fujii, Saitama (JP)

(73) Assignees: Nisshin Seifun Group Inc., Tokyo (JP);
Nisshin Engineering Inc., Tokyo (JP)

( * ) Notice: Subject to any disclaimer, the term of this patent is extended or adjusted under 35 U.S.C. 154(b) by 864 days.

(21) Appl. No.: 11/574,785

(22) PCT Filed: Sep. 7, 2005

(86) PCT No.: PCT/JP2005/016434

§ 371 (c)(1),
(2), (4) Date: Mar. 6, 2007

(87) PCT Pub. No.: WO2006/028140

PCT Pub. Date: Mar. 16, 2006

(65) Prior Publication Data

US 2008/0006954 A1   Jan. 10, 2008

(30) Foreign Application Priority Data

Sep. 7, 2004   (JP) .............................. 2004-259740
Feb. 22, 2005  (JP) .............................. 2005-046086
Mar. 8, 2005   (JP) .............................. 2005-063462
Jul. 27, 2005  (JP) .............................. 2005-216979

(51) Int. Cl.
B29B 9/00   (2006.01)

(52) U.S. Cl. .............................. 264/80; 264/5; 264/15; 425/6; 425/10

(58) Field of Classification Search ........................ None
See application file for complete search history.

(56) References Cited

U.S. PATENT DOCUMENTS

| 5,665,277 | A  | * | 9/1997  | Johnson et al. ................. 264/6 |
| 6,338,809 | B1 | * | 1/2002  | Hampden-Smith et al. ..... 264/7 |
| 6,582,763 | B1 |   | 6/2003  | Nishimura et al. .......... 427/216 |
| 7,125,537 | B2 | * | 10/2006 | Liao et al. ................. 423/592.1 |
| 7,374,704 | B2 | * | 5/2008  | Che et al. ..................... 264/13 |
| 2004/0178530 | A1 | * | 9/2004 | Yadav ............................ 264/5 |
| 2006/0226564 | A1 | * | 10/2006 | Carpenter ....................... 264/5 |

FOREIGN PATENT DOCUMENTS

| JP | 57-177342   | 11/1982 |
| JP | 04-147923   | 5/1992  |
| JP | 5-186864    | 7/1993  |
| JP | 6-29099     | 5/1994  |
| JP | 11-71107    | 3/1999  |
| JP | 11-226541   | 8/1999  |
| JP | 2000-219901 | 8/2000  |
| JP | 2002-88486  | 3/2002  |
| JP | 2005-170760 | 6/2005  |

OTHER PUBLICATIONS

Japanese Office Action
Japanese Office Action and partial English translation.

* cited by examiner

Primary Examiner—Mary Lynn F Theisen
(74) Attorney, Agent, or Firm—Whitman Curtis Christofferson & Cook, P.C.

(57) ABSTRACT

A fine particle producing process introduces a material for producing fine particles into a thermal plasma flame to make a vapor-phase mixture and quenches the vapor-phase mixture to form the fine particles. In the process, the material for producing the fine particles is dispersed or dissolved in a dispersion medium or solvent, preferably containing a combustible material to prepare a dispersion such as a slurry, a colloidal solution or a dissolution solution, the dispersion is made into a form of droplets, or the material for producing the fine particles is dispersed with a carrier gas and a combustible material and the dispersion in a droplet form or the dispersed material is introduced into the thermal plasma flame. In the fine particle producing process and apparatus, a gas of an amount sufficient to quench the vapor-phase mixture is supplied toward a tail of the thermal plasma flame. In the process and apparatus, primary fine particles are introduced into a cyclone to be subjected to cooling and classification and secondary fine particles having a particle size of 100 nm or less which are left upon removal of coarse particles are recovered.

32 Claims, 9 Drawing Sheets

PROCESS AND APPARATUS FOR PRODUCING FINE PARTICLES

TECHNICAL FIELD

The present invention relates to a process for producing fine particles by using a thermal plasma method, and an apparatus for carrying out such a process. More particularly, the present invention is directed to a process for producing fine particles which is capable of producing high-quality fine particles having a minute and uniform particle size and of providing high-quality fine particles having a minute and uniform particle size with high productivity, and an apparatus for carrying out such a process.

BACKGROUND ART

Fine particles such as oxide fine particles, nitride fine particles, and carbide fine particles have been used in the production of sintered bodies, for example, dielectric materials for semiconductor substrates, printed wiring boards and various, electrically insulated parts, materials for high-hardness and high-precision machining tools such as dies and bearings, functional materials for grain boundary capacitors, humidity sensors and the like, or precision sinter molding materials, and in the production of thermal sprayed parts, for example, engine valves, of materials that are required to be wear-resistant at a high temperature, as well as in the fields of electrode or electrolyte materials and various catalysts for fuel cells. Use of such fine particles improves bonding strengths between different ceramics or different metals in a sintered body or thermal sprayed part, or denseness or functionality thereof.

One of the methods for producing such fine particles is a vapor-phase method. The vapor-phase method includes a chemical method that involves chemically reacting various gases or the like at high temperatures and a physical method that involves applying an electron beam or laser beam to substances to decompose or evaporate the substances so as to form fine particles.

An example of the vapor-phase method is a thermal plasma method. The thermal plasma method is a method of producing fine particles by instantaneously evaporating a raw material in thermal plasma and then quenching and condensing/solidifying the evaporated material to produce fine particles. This method has many advantages such as high cleanness, high productivity, applicability to high melting point materials because of high heat capacity at high temperatures, and easy preparation of composite material particles as compared with other vapor-phase methods. Therefore, the thermal plasma method is often used as a method of producing fine particles (see, for instance, Patent Document 1).

In the conventional process for producing fine particles using a thermal plasma method, fine particles are produced by powdering a raw material, dispersing the powdered material (powder material, or powder) with a carrier gas to charge the material directly into a plasma flame (see, for instance, Patent Document 1).

Patent Document 1 describes a technique of producing fine particles by introducing (supplying) powdered raw materials into a thermal plasma flame to evaporate the materials and quenching the resulting vapor-phase mixture, that is to say, a method of producing oxide-coated fine metal particles which involves combining powder materials for fine metal particles and for a coating layer with each other, introducing a raw material mixture into a thermal plasma (i.e., thermal plasma flame) in an inert or reducing atmosphere so as to evaporate the raw materials to obtain a vapor-phase mixture, and quenching the mixture thus obtained.

In the method of producing fine particles described in Patent Document 1 as above, the vapor-phase mixture is cooled by separating the mixture together with a plasma gas, a carrier gas, and a gas derived from a powdery raw material far enough from the thermal plasma flame to introduce the mixture into a quenching tube for cooling it. It is also described in Patent Document 1 that the vapor-phase mixture is cooled in the course of separation far enough from the thermal plasma flame by an intermediate cooling section provided upstream of the above-mentioned quenching tube.

Patent Document 1: JP 2000-219901 A

However, the method of producing fine particles described in Patent Document 1 uses the technique of directly introducing a powdered raw material into a thermal plasma flame, in which the powdered raw material tends to agglomerate and is difficult to make monodisperse, so complete reaction of the raw material in the thermal plasma flame cannot occur, thus giving adverse influence on the uniformity of fine particles or resulting in a decrease in quality such as generation of impurities. Also, in the case where a raw material is in the form of powder, it is difficult to continue to introduce or supply accurately a fixed amount of raw material into a thermal plasma flame, so the resultant fine particles tend to become non-uniform.

In addition, in the conventional cooling technique described in Patent Document 1 as above, it is difficult to uniformly cool a vapor-phase mixture, and hence the fine particles formed tend to have a non-uniform particle size or shape. Also, the fine particles just after the formation tend to collide with one another to cause agglomeration, which gives an adverse influence on the uniformity of the particle size and shape of the fine particles. Further, the cooling performance of the above-mentioned cooling technique depends on the amounts of a plasma gas, a carrier gas, and a gas derived from a powdery raw material, and it is difficult to keep the gases constant in amount. Therefore, with this cooling technique, it has been difficult to control the particle size and the uniformity in particle size of the fine particles formed.

Further, since it is generally difficult to uniformly cool the vapor-phase mixture obtained by evaporation of raw materials, the formed fine particles tend to be non-uniform in shape or particle size, and the fine particles just after the formation tend to collide with one another to agglomerate, which gives an adverse influence on the uniformity of the fine particles.

DISCLOSURE OF THE INVENTION

Problems to be Solved by the Invention

A first object of the present invention is to overcome the above-mentioned problems in the art and provide a process for producing fine particles which can provide high-quality fine particles having a uniform particle size with high productivity.

A second object of the present invention is to overcome the above-mentioned problems in the art and provide a process for producing fine particles which can provide higher-quality fine particles having a minute and uniform particle size with higher productivity, and an apparatus for carrying out such a process, by making a further improvement to the step of quenching a vapor-phase mixture.

A third object of the present invention is to overcome the above-mentioned problems in the art and provide a process for producing fine particles which can provide even higher-quality fine particles having a minute and uniform, and as-desired particle size with even higher productivity, and an apparatus for carrying out such a process, by making a further improvement to the step of recovering the formed fine particles.

Means to Solve the Problems

Note that in relation to the technology of introducing (supplying) raw materials into a thermal plasma flame, the inventors of the present invention have proposed in Japanese Patent Application No. 2003-415560 (JP 2005-170760 A published on Jun. 30, 2005) a process for producing fine particles of simple oxide, composite oxide, double oxide, and oxide solid solution by adding powdery raw materials to a solvent to prepare a slurry, making the slurry into the form of droplets, introducing the slurry in droplet form into a thermal plasma flame to evaporate it so as to make a mixture in a vapor phase, and quenching the vapor-phase mixture.

The inventors of the present invention have made extensive studies in order to achieve the first to third objects as above in addition to the objects of Patent Document 1 and the above-mentioned earlier application each providing a process for producing fine particles. As a result, they have found that higher-quality fine particles having a minute and uniform, and as-desired particle size can be obtained with higher productivity by improving the process and apparatus for producing fine particles described in the earlier application, to be more specific, by suspending or dissolving a material or materials for producing fine particles as a raw material to prepare a colloidal solution or dissolution solution, or causing the slurry, colloidal solution or dissolution solution of a raw material, a carrier gas or the like to contain a combustible material, and further by introducing a sufficient amount of gas toward the tail of a thermal plasma flame so as to quench a vapor-phase mixture, or by recovering the formed fine particles using a cyclone, and thus completed the present invention.

To achieve the first object, according to a first aspect of the present invention, there is provided a process for producing fine particles including the steps of introducing a material or materials for producing fine particles into a thermal plasma flame to make a vapor-phase mixture, and quenching the vapor-phase mixture to form fine particles, in which the step of introducing a material or materials for producing fine particles into a thermal plasma flame includes the step of dispersing or dissolving the material or materials for producing fine particles in a dispersion medium or solvent containing a combustible material to prepare a dispersion and making the dispersion into the form of droplets so as to introduce the dispersion in droplet form into the thermal plasma flame, or the step of dispersing the material or materials for producing fine particles with a carrier gas and a combustible material and introducing the dispersed material or materials for producing fine particles into the thermal plasma flame.

To achieve the first object, according to a second aspect of the present invention, there is provided a process for producing fine particles including the steps of introducing a material or materials for producing fine particles into a thermal plasma flame to make a vapor-phase mixture, and quenching the vapor-phase mixture to form fine particles, in which the step of introducing a material or materials for producing fine particles into a thermal plasma flame includes the step of dissolving the material or materials for producing fine particles in a solvent to prepare a solution and making the solution into the form of droplets so as to introduce the solution in droplet form into the thermal plasma flame.

To achieve the second object, according to a third aspect of the present invention, there is provided a process for producing fine particles including the steps of introducing a material or materials for producing fine particles into a thermal plasma flame to make a vapor-phase mixture, and supplying a gas of an amount sufficient to quench the vapor-phase mixture toward the tail (end portion) of the thermal plasma flame to form fine particles.

To achieve the third object, according to a fourth aspect of the present invention, there is provided a process for producing fine particles including the steps of introducing primary fine particles formed by a predetermined treatment into at least one cyclone to subject the primary fine particles to cooling and classification based on a predetermined particle size, removing coarse particles having a particle size equal to or greater than the predetermined particle size by the classification, and recovering secondary fine particles having a particle size of 100 nm or less which are left upon removal of the coarse particles.

The treatment for forming the primary fine particles is preferably a treatment in which a material or materials for producing fine particles is dispersed and then introduced into a thermal plasma flame so as to evaporate the material or materials for producing fine particles to make a vapor-phase mixture.

In the treatment for forming the primary fine particles to be performed according to this aspect, after the material or materials for producing fine particles is evaporated to make a vapor-phase mixture, a gas for quenching the mixture is preferably supplied toward the tail (end portion) of the thermal plasma flame in an amount sufficient for the quenching, and more preferably in an amount 200% to 5,000% larger than the amount of the gas introduced into the thermal plasma flame.

The gas introduced into the thermal plasma flame refers to a combination of a plasma gas (sheath gas, central gas) for forming the thermal plasma flame and a gas for spraying the material or materials for producing fine particles (spray gas or carrier gas).

With respect to the above-mentioned aspects, the step of dispersing the material or materials for producing fine particles and introducing it into a thermal plasma flame preferably includes the step of dispersing the material or materials for producing fine particles in a dispersion medium to prepare a slurry, or dispersing the material or materials for producing fine particles in a combustible material to prepare a slurry, or dispersing the material or materials for producing fine particles using a dispersion medium and a combustible material to prepare a slurry, or dispersing the material or materials for producing fine particles in a dispersion medium and then adding thereto a combustible material to prepare a slurry; making the slurry into the form of droplets; and introducing the slurry in droplet form into the thermal plasma flame.

With respect to the above-mentioned aspects, it is also preferable that the step of dispersing the material or materials for producing fine particles and introducing it into a thermal plasma flame includes the step of suspending the material or materials for producing fine particles in a dispersion medium or subjecting a solution of the material or materials for producing fine particles to a chemical reaction to prepare a colloidal solution, or suspending the material or materials for producing fine particles in a combustible material or subjecting a solution of the material or materials for producing fine particles to a chemical reaction to prepare a colloidal solution, or suspending the material or materials for producing fine particles in a dispersion medium and a combustible material or subjecting a solution of the material or materials for producing fine particles to a chemical reaction to prepare a colloidal solution, or suspending the material or materials for producing fine particles in a dispersion medium or subjecting a solution of the material or materials for producing fine particles to a chemical reaction, and then adding a combustible material to prepare a colloidal solution; making the colloidal solution into the form of droplets; and introducing the colloidal solution in droplet form into the thermal plasma flame.

With respect to the above-mentioned aspects, it is also preferable that the step of dispersing the material or materials for producing fine particles and introducing it into a thermal plasma flame includes the step of dissolving the material or materials for producing fine particles in a solvent to prepare a dissolution solution, or dissolving the material or materials for producing fine particles using a combustible material to prepare a dissolution solution, or dissolving the material or materials for producing fine particles using a solvent and a combustible material to prepare a dissolution solution, or dissolving the material or materials for producing fine particles in a solvent, and then adding a combustible material to prepare a dissolution solution; making the dissolution solution into the form of droplets; and introducing the dissolution solution in droplet form into the thermal plasma flame.

With respect to the above-mentioned aspects, it is also preferable that the step of dispersing the material or materials for producing fine particles and introducing it into a thermal plasma flame includes the step of dispersing the material or materials for producing fine particles using a carrier gas (or spray gas), or dispersing the material or materials for producing fine particles using a carrier gas (or spray gas) and a combustible material; and introducing the dispersed material or materials for producing fine particles into the thermal plasma flame.

The definitions of the slurry, colloidal solution and dissolution solution as used herein are as follows. A mixture in a state where solid particles that are not observable with an ordinary optical microscope but is greater than atoms or small molecules are dispersed in a liquid is called a colloidal solution (or sol), a mixture in a state where solid particles greater than the above, that is, those particles which are observable with an ordinary optical microscope are dispersed in a liquid is called a slurry, and a mixture in an ionized state, inclusive of a supersaturated state in which precipitates are present, is called a dissolution solution. The colloidal solution and dissolution solution are collectively called solutions, and when it is evident with no particular designation that the mixture in question is a dissolution solution, the dissolution solution may simply be called the solution. Further, the slurry, colloidal solution and dissolution solution herein referred to may each be called a dispersion. The present invention is not involved in the details of dispersion states, and what is important is that, according to the present invention, a material or materials for producing fine particles, inclusive of a precursor for forming fine particles, or a decomposition product thereof has an initial state in which it is dispersed in a dispersion medium including a gas in a certain manner.

In each of the above-mentioned processes, the combustible material is preferably the one that increases the temperature of a thermal plasma flame and at the same time has the effect of stabilizing the thermal plasma flame. Note that various liquid and solid materials can be used as the combustible material. When a solid combustible material is used, it is preferable that the solid combustible material be dispersed or dissolved in a solvent (inclusive of combustible materials that are used as solvents) before it is used.

In each of the above-mentioned processes, it is preferable that one or more substances selected from the group consisting of a surfactant, a high polymer, and a coupling agent be added singly or in admixture to the above-mentioned dispersion, solution, slurry, colloidal solution, dissolution solution, and dispersed material or materials for producing fine particles.

Further, components that constitute the material or materials for producing fine particles are preferably simple oxides, composite oxides, double oxides, oxide solid solutions, metals, alloys, hydroxides, carbonate compounds, halides, sulfides, nitrides, carbides, hydrides, metal salts or organometallic compounds that contain at least one element selected from the group consisting of the elements having atomic numbers of 3 to 6, 11 to 15, 19 to 34, 37 to 52, 55 to 60, 62 to 79, and 81 to 83.

On the other hand, to achieve the second object, according to a fifth aspect of the present invention, there is provided a fine particle producing apparatus including: a material supplying section that disperses a material or materials for producing fine particles and supplies the dispersed material into a thermal plasma flame; a plasma torch connected to the material supplying section that generates the thermal plasma flame so as to evaporate the material or materials for producing fine particles to make a vapor-phase mixture; a cooling chamber connected to the plasma torch that provides a space necessary to quench the vapor-phase mixture; and a gas supplying section that supplies a gas of an amount sufficient to quench the vapor-phase mixture toward the tail of the thermal plasma flame.

In addition, to achieve the third object, according to a sixth aspect of the present invention, there is provided a fine particle producing apparatus, including: a material supplying section that disperses a material or materials for producing fine particles and supplies the dispersed material into a thermal plasma flame; a plasma torch connected to the material supplying section that generates the thermal plasma flame so as to evaporate the material or materials for producing fine particles to make a vapor-phase mixture; a cooling chamber connected to the plasma torch that provides a space necessary to quench the vapor-phase mixture; and at least one cyclone as a classifying section into which primary fine particles formed by quenching the vapor-phase mixture are introduced.

Preferably, the fine particle producing apparatus according to this aspect further includes a gas supplying section that supplies a gas of an amount sufficient to quench the vapor-phase mixture toward the tail (end portion) of the thermal plasma flame.

The material supplying section as above preferably includes a material preparing section that disperses the material or materials for producing fine particles to prepare a slurry and stores the slurry thus prepared, and a spray section connected to the material preparing section that sprays the slurry into the thermal plasma flame inside the plasma torch. Alternatively, the material supplying section preferably includes a material preparing section that suspends the material or materials for producing fine particles or subjects a solution of material or materials for producing fine particles to a chemical reaction to prepare a colloidal solution and stores the colloidal solution thus prepared, and a spray section connected to the material preparing section that sprays the colloidal solution into the thermal plasma flame inside the plasma torch.

It is also preferable that the material supplying section includes a material preparing section that dissolves the material or materials for producing fine particles to prepare a dissolution solution and stores the dissolution solution thus prepared, and a spray section connected to the material preparing section that sprays the dissolution solution into the thermal plasma flame inside the plasma torch. It is preferable again that the material supplying section includes a powder material supplying section that delivers a powder material as the material or materials for producing fine particles from a section for its storage, and a section for transportation by gas connected to the powder material supplying section that disperses the powder material with a carrier gas and supplies the dispersed material into the thermal plasma flame inside the plasma torch.

In the process for producing fine particles according to the present invention, it is preferable that the primary fine particles be introduced into the cyclone at a flow rate of 10 m/sec or more.

Further, in the process for producing fine particles according to the present invention, it is preferable that the pressure in the cyclone be equal to or lower than atmospheric pressure.

In the process for producing fine particles according to the present invention, the amount of the gas supplied toward the tail of the thermal plasma flame, that is to say, supplied into the cooling chamber, is to be sufficient to quench the vapor-phase mixture and is preferably, for example, such that, in the cooling chamber (also referred to simply as "chamber") that provides a space necessary to quench the vapor-phase mixture, the gas supplied or introduced into the cooling chamber has an average flow rate in the cooling chamber (hereinafter, referred to as "in-chamber flow rate") of 0.001 to 60 m/sec, more preferably 0.5 to 15 m/sec, and even more preferably 0.5 to 10 m/sec.

Further, the direction in which the gas is supplied or introduced into the cooling chamber is preferably such that it forms an angle $\alpha$ within the range of $90°<\alpha<240°$ (more preferably $100°<\alpha<180°$) with respect to the tail (end portion) of the thermal plasma flame that is located in the cooling chamber when the vertically upward direction is assumed to give an angle of $0°$, and forms an angle $\beta$ within the range of $-90°<\beta<90°$ (more preferably $-45°<\beta<45°$) when the direction from a gas ejection nozzle toward the thermal plasma flame is assumed to give an angle of $0°$.

Here, the usefulness of a cyclone in the present invention is explained.

The description on cyclones in "Theory and Calculation on Chemical Machines" (second edition) (Kamei, Saburo, Sangyo Tosho Publishers, Inc., 1974) (for example, page 482) indicates that, at that time, a high-performance cyclone (of a small size and with a high pressure loss, for example a multiclone), can collect particles of a size down to about 5 μm. Although there have been some progresses in technology since then, cyclones that enable separation of primary particles having a particle size down to 2 μm are considered as the highest in performance even nowadays.

On the other hand, the particle size of the fine particles to be produced by the process and apparatus according to the present invention is much smaller than the separation limit diameters of such cyclones as above, and specifically is 100 nm or less. Therefore, it has not been contemplated conventionally to utilize cyclones in the process of recovering fine particles: the recovery of fine particles has been regarded as, so to speak, being outside the domain of applicability of cyclones.

The inventors of the present invention made extensive studies on utilization of cyclones in the fine particle recovering process and, as a result, they have realized the process and apparatus for producing fine particles as will be described later, which can bring about high-quality fine particles having a minute and uniform, and as-desired particle size with high productivity, by allowing a cyclone to function as a "retention time extending means" for increasing the effect of cooling the fine particles formed in the thermal plasma flame, as well as a "classifying means."

Effects of the Invention

According to the first and second aspects of the present invention, high-quality fine particles having a uniform particle size can be produced with high productivity.

More specifically, according to the first and second aspects of the present invention, fine particles having a high functionality can be produced which are not only applicable as conventional to, for instance, dielectric materials for semiconductor substrates, printed-circuit boards and various, electrically insulated parts, but can find application in new fields of electrode or electrolyte materials and various catalysts for fuel cells, and so forth.

When a combustible material is used, it is possible to increase the amount of recovered fine particles of the present invention by increasing the mass of the combustible material based on the total mass of the dispersion medium and the material or materials for producing fine particles.

In addition to the above-mentioned effects, according to the third and fifth aspects of the present invention, the material or materials for producing fine particles that have been evaporated in a thermal plasma flame and are thereby in a vapor phase can be quenched, which enables production of high-quality fine particles having a minute and uniform particle size with high productivity.

Note that, also according to the third and fifth aspects of the present invention, fine particles having a stable crystal phase at high temperatures can be produced in proportions greater than conventional. As is well known, a change in crystal structure results in a change in physical properties or characteristics, and makes it possible to produce fine particles having different values than conventional ones. This effect is none other than the possibility of producing a novel material.

Moreover, according to the fourth and sixth aspects of the present invention, high-quality fine particles having a uniform and as-desired particle size can be produced with a very high productivity by removing from powdery fine particles coarse particles having a particle size greater than the as-desired particle size by the use of a cyclone, thereby enabling the recovery of only fine particles having a desired particle size.

Further, use of a cyclone enables cooling of fine particles in the cyclone and this makes it unnecessary to provide fins or a cooling passage used as a cooling mechanism. As a result, it becomes unnecessary to stop the operation of the production apparatus so as to remove the fine particles accumulated among the fins, resulting in prolongation of the operating time of the apparatus and an increase in recovery yield of fine particles. Also, it is possible to prevent enlargement of the production apparatus in order to provide fins or a cooling passage in the apparatus.

BEST MODE FOR CARRYING OUT THE INVENTION

Hereinafter, the process and apparatus for producing fine particles according to the present invention will be explained in detail based on the preferred embodiments shown in the attached drawings.

Figure 1:
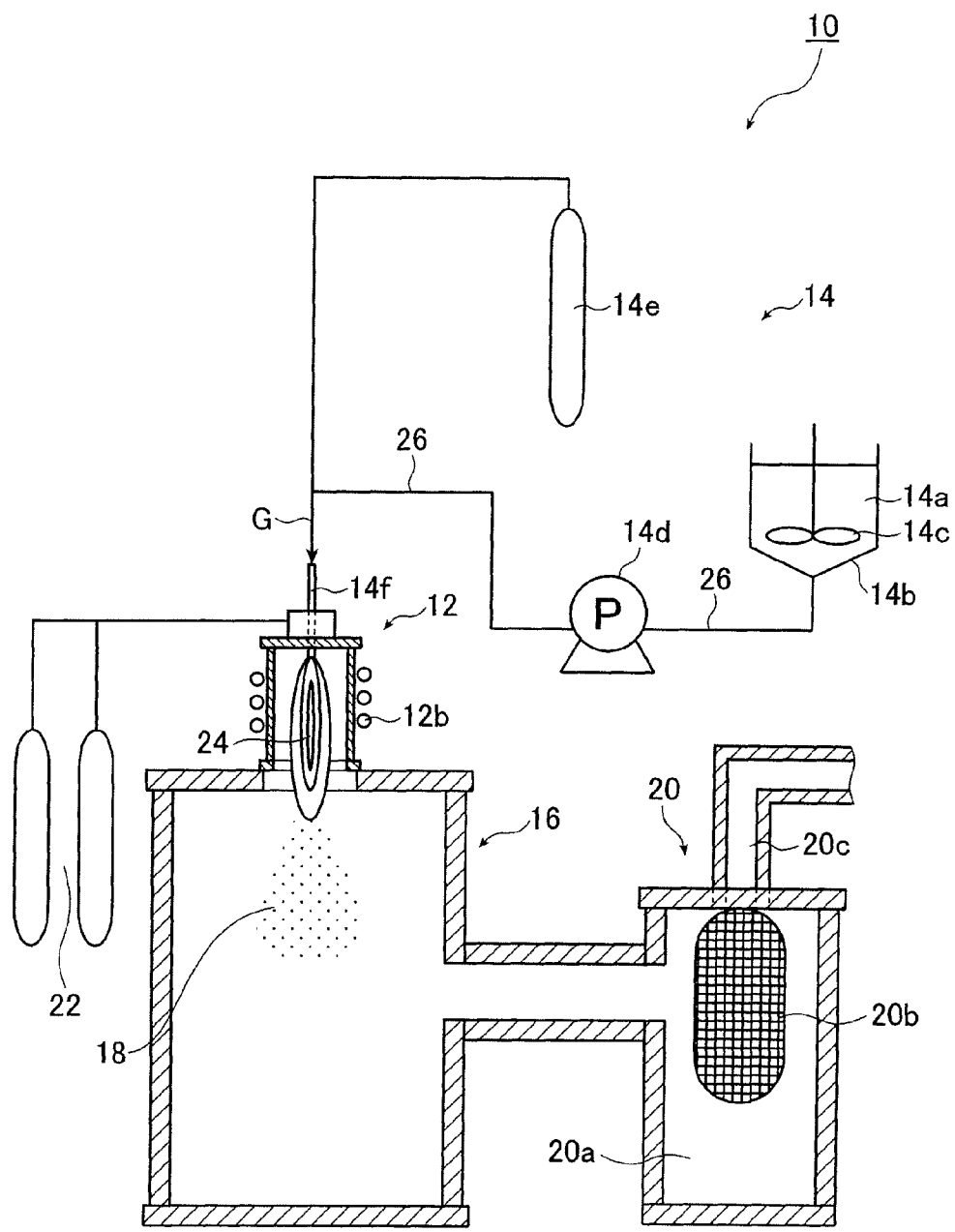
FIG. 1 is a schematic cross-sectional view showing an overall construction of an embodiment of the fine particle producing apparatus according to the present invention.
Figure 2:
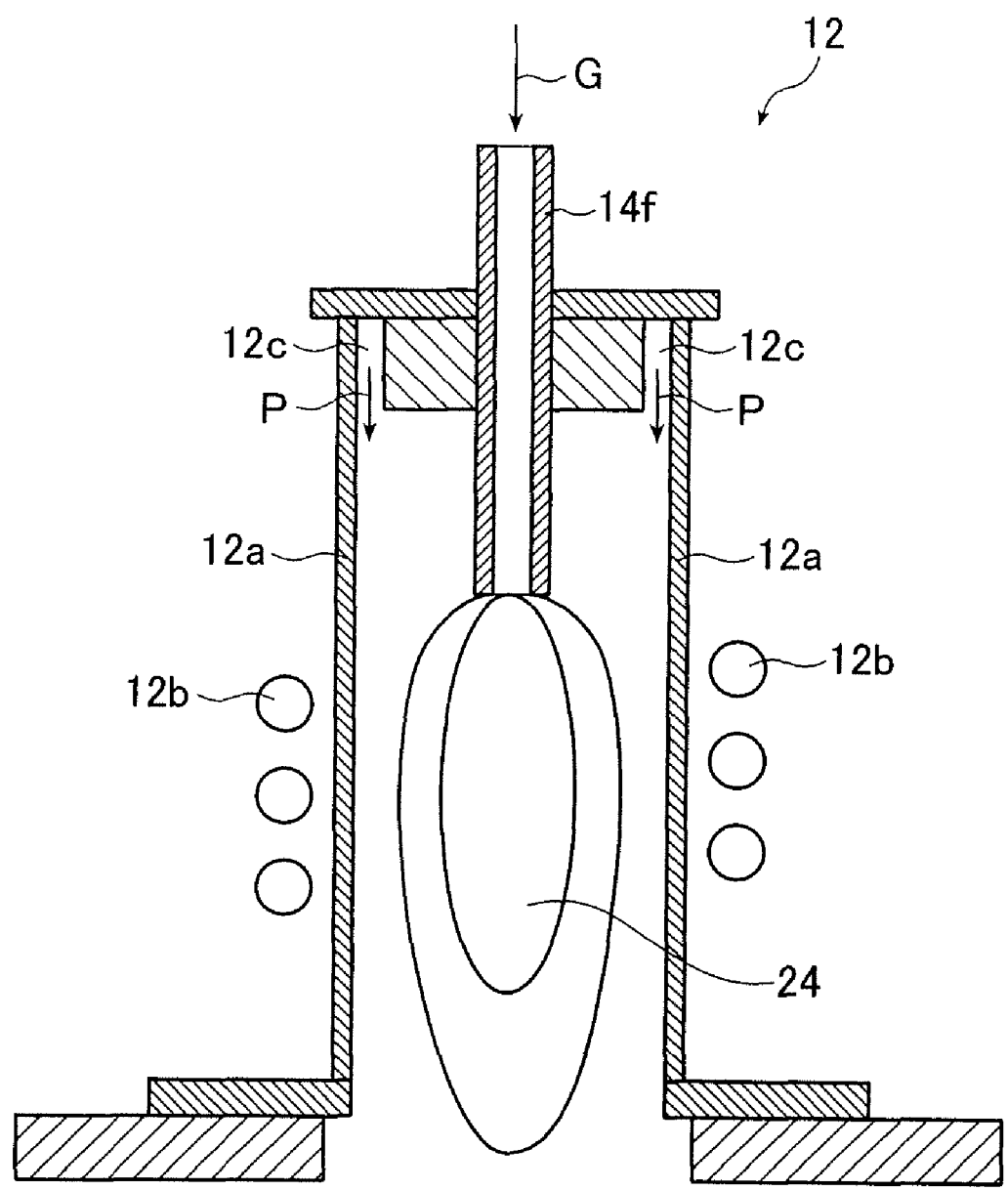
FIG. 2 is an enlarged cross-sectional view showing the vicinity of the plasma torch of the fine particle producing apparatus shown in FIG. 1.
Figure 3:
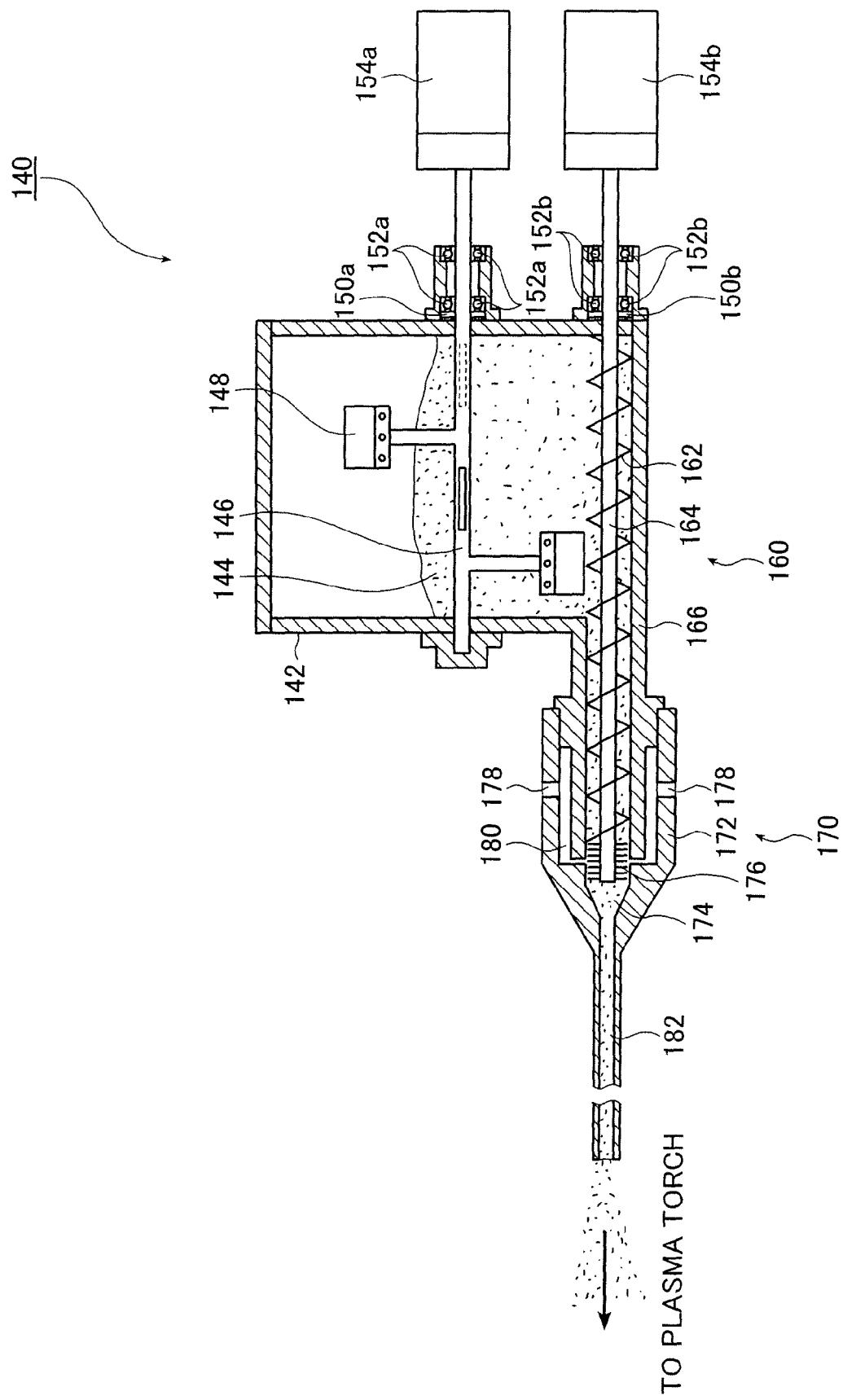
FIG. 3 is a cross-sectional view showing a general construction of an example of the material supply unit of the fine particle producing apparatus shown in FIG. 1, which example is adapted for the use of a powder material.

First, referring to FIGS. 1 to 3, the processes for producing fine particles according to the first and second aspects of the present invention are explained.

FIG. 1 is a schematic cross-sectional view showing an overall construction of a first embodiment of the fine particle producing apparatus of the invention, which is the apparatus that exploits the processes for producing fine particles according to the first and second aspects of the present invention. FIG. 2 is a partial magnification showing the vicinity of a plasma torch 12 of the fine particle producing apparatus shown in FIG. 1. Here, a first production mode, which is a process for producing fine particles by using the fine particle producing apparatus shown in FIG. 1 and a slurry, is described as a typical example. However, it is needless to say that the present invention is not limited thereto.

A fine particle producing apparatus 10 of the embodiment shown in the above figures includes the plasma torch 12 for generating thermal plasma, a material supply unit 14 for supplying (introducing) a material or materials for producing fine particles to the inside of the plasma torch 12, a chamber 16 serving as a cooling tank for forming fine particles 18, and a recovery section 20 for recovering the formed fine particles 18.

As shown in FIG. 2, the plasma torch 12 includes a quartz tube 12a, and a coil 12b for high frequency oscillation which surrounds the quartz tube. The top of the plasma torch 12 has a supply tube (or introduction tube) 14f provided in the center thereof for the supply (introduction) or charge of the material or materials for producing fine particles and a spray gas (carrier gas) to the inside of the plasma torch 12, which will be described later, and a plasma gas supply port or ports (introduction port or ports) 12c formed in the marginal region thereof (on one circle).

The plasma gas is sent from a plasma gas source 22 to the plasma gas supply port 12c. Examples of the plasma gas include argon, nitrogen, hydrogen, and oxygen. In the plasma gas source 22, for example, two kinds of plasma gases are provided. The plasma gas is sent from the plasma gas source 22 to the inside of the plasma torch 12 through the plasma gas supply port or ports 12c in the form of a ring as indicated by an arrow P. Then, high frequency current is applied to the coil 12b for high frequency oscillation to generate a thermal plasma flame 24.

In the thermal plasma flame 24 thus generated inside the plasma torch 12, the material or materials for producing fine particles supplied from the material supply unit 14 as described later, that is, a slurry 14a supplied from the material supply unit 14 and sprayed through the supply tube 14f so as to make it in droplet form in this mode, is evaporated to make a vapor-phase mixture.

Note that the outside of the quartz tube 12a is surrounded by a tube (not shown) formed concentrically, and cooling water is circulated through a space between this tube and the quartz tube 12a to cool the quartz tube 12a in order to protect the quartz tube 12a against too high a temperature due to the thermal plasma flame 24 generated in the plasma torch 12.

The material supply unit 14, as being connected to the top of the plasma torch 12, disperses the material or materials for producing fine particles and supplies the dispersed material into the plasma torch 12. In this mode, a material or materials for producing fine particles which have been powdered (hereinafter, referred to simply as "powdery raw material") is added to a dispersion medium containing a combustible material and stirred. The resultant slurry 14a in which the powdery raw material is dispersed is supplied from the material supply unit 14 into the plasma torch 12. That is, a feature of this mode is that the slurry 14a used is a slurry obtained by adding a powdery raw material to a combustible material or materials for example, a combustible solvent and stirring the resultant mixture; a slurry obtained by adding a powdery raw material to a dispersion medium and a combustible material (combustible solvent) and stirring the resultant mixture; or a slurry obtained by adding a powdery raw material to a dispersion medium, stirring the resultant mixture, further adding a combustible material (combustible solvent), and then stirring the mixture.

The material supply unit 14 includes a container 14b for containing the slurry 14a, a stirrer 14c that stirs the slurry 14a in the container 14b, a pump 14d for applying a high pressure to the slurry 14a to supply the slurry 14a into the plasma torch 12 through the supply tube 14f, a spray gas supplying source 14e for supplying a spray gas used for spraying the slurry 14a into the plasma torch 12, the supply tube 14f for making the slurry 14a into the form of droplets to supply the slurry in droplet form to the inside of the plasma torch 12, and a tube 26 that connects the container 14b to the supply tube 14f through the pump 14d and transports the slurry 14a in the container 14b to the supply tube 14f.

The pressurized spray gas from the spray gas supplying source 14e, together with the slurry 14a fed by the pump 14d, is supplied into the thermal plasma flame 24 in the plasma torch 12 through the supply tube 14f as indicated by an arrow G. The supply tube 14f has a two-fluid nozzle mechanism for spraying the slurry 14a to make it into the form of droplets and supply the slurry in droplet form into the thermal plasma flame 24 in the plasma torch 12. The two-fluid nozzle mechanism is capable of spraying the slurry 14a to make it into the form of droplets and supply the slurry in droplet form into the thermal plasma flame 24 in the plasma torch 12 by using the spray gas. As the spray gas, argon, nitrogen, hydrogen, oxygen, air, and so on are used alone or in combination as appropriate.

As mentioned above, the two-fluid nozzle mechanism can apply a high pressure to a slurry and spray the slurry using a spray gas as a gaseous medium, and is used as a means for making a slurry into the form of droplets. For example, if spraying is carried out by using a nozzle with an inner diameter of 1 mm and feeding a slurry at a feed pressure of 0.2 to 0.3 MPa and a flow rate of 20 ml per minute while feeding a spray gas at a rate of 10 to 20 l per minute, droplets of about 5 to 10 μm in size will be obtained.

Note that while a two-fluid nozzle mechanism is used in this embodiment, a single-fluid nozzle mechanism may also be used. Examples of the method whose use may further be contemplated include a method that involves causing a slurry to fall at a constant speed onto a rotating disk so as to make the slurry into the form of droplets owing to the centrifugal force (method of forming droplets), and a method that involves applying a high voltage to the surface of a slurry to make the slurry into the form of droplets (method of generating droplets).

On the other hand, as shown in FIG. 1, the chamber 16 is provided below and adjacent to the plasma torch 12. The chamber 16 is adapted to quench the vapor-phase mixture, which is made by spraying the slurry 14a into the thermal plasma flame 24 in the plasma torch 12 to make it into the form of droplets and evaporate the slurry in droplet form, immediately after the mixture is made to thereby form fine particles 18: thus the chamber 16 serves as a cooling tank. That is, the slurry 14a sprayed from the material supply unit 14 into the plasma torch 12 assumes the form of droplets, then reacts and evaporates in the thermal plasma flame 24 to give a vapor-phase mixture and, immediately thereafter, the vapor-phase mixture is quenched in the chamber 16 to form the fine particles 18.

On a lateral side of the chamber 16 is provided a recovery section 20 that recovers the formed fine particles 18. The recovery section 20 includes a recovery chamber 20a, a filter 20b provided in the recovery chamber 20a, and a vacuum pump (not shown) connected to the recovery chamber 20a through a tube 20c provided on the top of the chamber. The formed fine particles 18 are drawn into the recovery chamber 20a by the suction with the vacuum pump, so that they are recovered as being caught on the surface of the filter 20b.

Basically, the fine particle producing apparatus of this embodiment is constructed as mentioned above. Then, while explaining the operation of this fine particle producing apparatus, the process for producing fine particles using a slurry is explained with reference to the apparatus, the process being the first production mode corresponding to the process for producing fine particles according to the first aspect of the present invention.

In the first production mode corresponding to the process for producing fine particles according to the present aspect, for example, first, a powdered material or materials for producing fine particles (powdery raw material) is dispersed in a dispersion medium, then a combustible material (for example, a combustible solvent) is added to the dispersion medium in which the powdery raw material is dispersed, to thereby prepare a slurry. The mass ratio of the powdery raw material, the dispersion medium and the combustible material in the slurry may be, for example, 4:3:3 (40%:30%:30%) and is not limitative. It is possible to prepare a slurry by varying the mass ratio between the powdery raw material, the dispersion medium and the combustible material as appropriate.

More specifically, taking the total mass of the powdery raw material, dispersion medium, and combustible material as 100%, the mass of the powdery raw material is within the range of 1 to 80%. Further, taking the rest as 100%, the mass of the dispersion medium is within the range of 0.1 to 99.9%, preferably 1 to 99%, and that of the combustible material is within the range of 99.9 to 0.1%, preferably 99 to 1%. The mass ratio may be changed as appropriate as long as the total mass comprises 100%.

The powdery raw material is not particularly limited as far as it can be evaporated by the thermal plasma flame. Preferable examples thereof include the following: simple oxides, composite oxides, double oxides, oxide solid solutions, metals, alloys, hydroxides, carbonate compounds, halides, sulfides, nitrides, carbides, hydrides, metal salts and organometallic compounds that contain at least one element selected from the group consisting of the elements having atomic numbers of 3 to 6, 11 to 15, 19 to 34, 37 to 52, 55 to 60, 62 to 79, and 81 to 83. These materials may be selected as appropriate for use.

Note that the simple oxides refer to oxides consisting of oxygen and one element in addition to the oxygen. The composite oxides refer to oxides composed of multiple species. The double oxides refer to higher oxides composed of two or more kinds of oxides. The oxide solid solutions refer to solids obtained by uniformly dissolving different oxides with each other. Further, the metals refer to substances consisting of one metal elements only, and the alloys refer to substances consisting of two or more metal elements. Such substances may have a textural state of solid solution, eutectic mixture, intermetallic compound, or a mixture thereof.

The hydroxides refer to those constituted of a hydroxyl group and one or more metal elements. The carbonate compounds refer to compounds constituted of a carbonate group and one or more metal elements. The halides refer to those constituted of a halogen element and one or more metal elements. The sulfides refer to those constituted of sulfur and one or more metal elements. The nitrides refer to those constituted of nitrogen and one or more metal elements. The carbides refer to those constituted of carbon and one or more metal elements. The hydrides refer to those constituted of hydrogen and one or more metal elements. The metal salts refer to ionic compounds that contain at least one metal element. The organometallic compounds refer to organic compounds that contain a bond of one or more metal elements with at least any of elements C, O, and N, and examples thereof include metal alkoxides and organometallic complexes.

Examples of simple oxides include titanium oxide ($TiO_2$), zirconium oxide ($ZrO_2$), calcium oxide (CaO), silicon oxide ($SiO_2$), aluminum oxide (alumina: $Al_2O_3$), silver oxide ($Ag_2O$, AgO, or $Ag_2O_3$), iron oxide (FeO, $Fe_3O_4$, or $Fe_2O_3$), magnesium oxide (MgO), manganese oxide ($Mn_3O_4$, MnO, $Mn_2O_3$, $MnO_2$, or $Mn_2O_7$), yttrium oxide ($Y_2O_3$), cerium oxide, samarium oxide, beryllium oxide (BeO), vanadium oxide ($V_2O_5$), chromium oxide ($Cr_2O_3$), and barium oxide (BaO).

Examples of composite oxides include lithium aluminate ($LiAlO_2$), yttrium vanadate, calcium phosphate, calcium zirconate ($CaZrO_3$), lead titanium zirconate, iron titanium oxide ($FeTiO_3$), and cobalt titanium oxide ($CoTiO_3$). Examples of double oxides include barium stannate ($BaSnO_3$), barium (meta)titanate ($BaTiO_3$), lead titanate ($PbTiO_3$), and a solid solution obtained by dissolving zirconium oxide and calcium oxide in barium titanate.

Further, hydroxides are exemplified by $Al(OH)_3$ and $Zr(OH)_4$, carbonate compounds by $CaCO_3$, halides by $MgF_2$, sulfides by ZnS, nitrides by TiN, carbides by SiC, and hydrides are exemplified by $TiH_2$.

The combustible material as used in this mode is one that has an effect of stabilizing the thermal plasma flame 24 and is not limitative, while it preferably has a boiling point of 20° C. to 400° C. Specific examples of the combustible material that can be used include combustible solvents such as kerosene, gasoline, octane and alcohols, and combustible organic compounds. By mixing the combustible material in the dispersion medium in which the powdery raw material is dispersed, the temperature of the reaction field is increased to promote the reaction and in addition thereto, the flame is expanded by combustion of the combustible material itself, so the thermal plasma flame 24 used for the reaction is more stabilized than in the case where no combustible material is used and a stable, continuous operation can be practiced.

As mentioned above, not only liquid but also solid combustible materials can be used as the combustible material. When a solid combustible material is used, it is preferable that the solid combustible material be dispersed or dissolved in a solvent (inclusive of combustible materials used as a solvent) before it is used.

When the slurry 14a is prepared, at least one additive selected from the group consisting of a surfactant, a high polymer, and a coupling agent may be added singly or in admixture. The surfactant that can be used is, for example, a nonionic surfactant such as sorbitan fatty acid ester, the high polymer that can be used is, for example, ammonium polyacrylate, and the coupling agent that can be used is, for example, a silane coupling agent. By adding at least one additive selected from the group consisting of a surfactant, a high polymer, and a coupling agent singly or in admixture to the slurry 14a, agglomeration of the powder material in the dispersion medium can be prevented more effectively to stabilize the slurry 14a. Note that a conventional dispersion medium may be used as the dispersion medium for the slurry 14a. For example, liquids such as water and alcohols may be used. Such dispersion mediums as alcohols in themselves function as combustible solvents.

The slurry 14a prepared as mentioned above is charged into the container 14b in the material supply unit 14, and stirred with the stirrer 14c as shown in FIG. 1. This prevents precipitation of the powdery raw material in the dispersion medium (liquid) containing a combustible material, so that the slurry 14a in which the powdery raw material is dispersed in the dispersion medium is maintained. A slurry can also be prepared by supplying a powdery raw material, a dispersion medium, and a combustible material to the material supply unit 14.

Then, the slurry 14a is made into the form of droplets with the spray gas supplied from the spray gas supplying source 14e by the use of the above-mentioned two-fluid nozzle mechanism of the supply tube 14f, and the slurry 14a in droplet form is supplied into the thermal plasma flame 24 so as to evaporate it to make a vapor-phase mixture. That is, the slurry 14a in droplet form is supplied into the thermal plasma flame 24 that is being generated in the plasma torch 12 by being supplied into the plasma torch 12 and is evaporated, with the result that a vapor-phase mixture is made.

Since the slurry 14a in droplet form has to be converted into a vapor phase in the thermal plasma flame 24, the temperature of the thermal plasma flame 24 must be higher than the boiling point of the powdery raw material contained in the slurry 14a in droplet form to be introduced into the thermal plasma flame 24. The higher the temperature of the thermal plasma flame 24 is, the more easily the powdery raw material is converted into a vapor phase, so that a higher temperature is preferable. On the other hand, the temperature is not particularly limited and may be selected as appropriate depending on the powdery raw material. For example, by changing gas conditions, the temperature of the thermal plasma flame 24 may be set to 6,000° C., and theoretically, the temperature can reach about 10,000° C.

Further, the pressure of the atmosphere in the plasma torch 12, namely, the atmosphere around the thermal plasma flame 24, is preferably equal to or less than atmospheric pressure. Such a pressure is not particularly limited and may be set to, for example, 5 Torr to 750 Torr.

By quenching in the chamber 16 the vapor-phase mixture obtained by reaction and evaporation of the slurry 14a in the thermal plasma flame 24, the fine particles 18 are formed. The formed fine particles 18 are attracted by the vacuum pump (not shown) and recovered with the filter 20b in the recovery section 20.

In the first production mode corresponding to the process for producing fine particles according to the present aspect, a powdery raw material may be directly dispersed in a combustible solvent that serves as a combustible material to prepare the slurry 14a, or a powdery raw material may be dispersed in a mixture of a dispersion medium and a combustible solvent made in advance to prepare the slurry 14a. It is not always necessary to add a combustible solvent to a dispersion in which a powdery raw material is dispersed to prepare a slurry.

Generally, it is contemplated to use air, nitrogen, argon, hydrogen or the like as the carrier gas or spray gas. However, when the fine particles to be formed are oxide fine particles, it is advantageous to use oxygen as the carrier gas or spray gas. Note that it is not always necessary to supply the carrier gas or spray gas.

The fine particles produced by the first production mode have a narrow particle size distribution, that is, a uniform particle size, and have few coarse particles mixed therein. Specifically, they have an average particle size of 1 nm to 200 nm. By the process for producing fine particles according to this embodiment, for example, oxide fine particles, more specifically fine particles of simple oxides, composite oxides, double oxides, oxide solid solutions and so on can be produced. Further, fine particles obtained by chemical reactions starting from metals, alloys, hydroxides, carbonate compounds, halides, sulfides, nitrides, carbides, hydrides, metal salts or organometallic compounds as a raw material can be produced.

In a state where a powdery raw material is dispersed in a dispersion medium as in the first production mode, the agglomeration of the powdery raw material is avoided, so the particles of the powdery raw material are in a dispersed state in the dispersion medium. By mixing a combustible material such as a combustible solvent in such a dispersion medium, the reaction temperature is increased and the region of generation of a thermal plasma flame is expanded. With this effect, in the production process according to this embodiment, the reaction is promoted to increase the evaporation amount of the powdery raw material, so that the recovery rate of the formed fine particles is increased. Further, generation of a flame by combustion of the combustible material leads to expansion of the region where a thermal plasma flame is generated and improvement of the stability of the thermal plasma flame, so a stable, continuous operation can be practiced.

Also, in the first production mode, the slurry 14a in droplet form is supplied into the plasma torch 12, and control of the slurry so that its supply amount may be kept constant is easier than a similar control of the powdery raw material which is to be directly supplied in the conventional method. This makes it possible to supply (introduce) a constant amount of slurry in droplet form into the thermal plasma flame 24 to carry out the reaction of the slurry, with the formed fine particles having a controlled composition and including fewer coarse particles. Accordingly, high-quality, high-purity fine particles having a uniform particle size with a narrow particle size distribution can be produced.

Further, the powdery raw material is formulated into the slurry 14a, so that this production mode is free of such limitations due to the solubility of a raw material as involved in the case where a metal salt as a raw material or materials for fine particles is dissolved in a solution to prepare a dissolution solution. That is, in the slurry 14a, the powdery raw material can be contained in a liquid in amounts greater than its solubility permits. For this reason, the mass productivity of formed fine particles can be increased.

Further, since the slurry 14a can be obtained only by adding the powdery raw material to a liquid and stirring the resultant mixture, handling such as preparation of a raw material is easy.

In order to efficiently quench the vapor-phase mixture in the chamber 16, it is preferable that a gas for cooling be caused to blow into the chamber 16, and the gas is preferably caused to flow along the inner surface of the chamber 16 so as to prevent adhesion of the formed fine particles onto the inner surface of the chamber 16.

Then, as a second production mode corresponding to the processes for producing fine particles according to the first and second aspects of the present invention, a process for producing fine particles from a colloidal solution by the use of the fine particle producing apparatus of the first embodiment is explained.

As mentioned above, in the specification of the present application, the difference between a slurry and a colloidal solution is considered to lie mainly in size and shape of particles dispersed in a liquid. The colloidal particles may not always be in the shape of general particles but may be amorphous. Therefore, the fine particle producing apparatus used in the process of the second production mode may be of a construction similar to that of the fine particle producing apparatus used in the first production mode (see FIG. 1). Thus, explanation is made below on the process for producing fine particles of the second production mode in which the above-mentioned fine particle producing apparatus is used.

The method for preparing a colloidal solution in the second production mode corresponding to the processes for producing fine particles according to the present aspects includes, for example, a sol-gel method using various metal alkoxides as a starting material (also referred to as a metal alkoxide method or simply as an alkoxide method). Solvents that can suitably be used for the preparation include alcohol solvents (ethanol, propanol and so on). In addition to the sol-gel method, various liquid-phase synthesis methods such as a coprecipitation method, a reduction method, and an emulsion method can be used for preparing colloidal solutions.

Metal alkoxides made with various metals are commercially available, examples of which include those made with Si, Ti, Zr, Al and so on, as well as those made with La—Al, Mg—Al, Ni—Al, Zr—Al, Ba—Zr and so on (two-metal alkoxides). These metal alkoxides are usually solid but may be liquid in some cases.

When a combustible material (combustible solvent) is used, the various ones as explained above in the description on the first production mode may suitably be used. Mixing the combustible material with the above-mentioned colloidal solution increases the reaction temperature to promote the reaction and in addition combustion of the combustible material in itself expands the flame. Therefore, the thermal plasma flame used for the reaction is further stabilized, and a stable, continuous operation can be practiced.

Similar to the above, the colloidal solution prepared by dispersing and mixing of a material or materials for producing fine particles, a solvent and a combustible material is supplied to the container 14b of the material supply unit 14 shown in FIG. 1 and sufficiently stirred with the stirrer 14c. This maintains the state of dispersion in the colloidal solution well. The colloidal solution may be prepared in the material supply unit 14 either by supplying the material or materials for producing fine particles, solvent and combustible material to the container 14b to carry out suspension or by subjecting a solution of the material or materials for producing fine particles to a chemical reaction.

Subsequently, fine particles are formed by following the process for producing fine particles described above as the first production mode in which the powder material is used in the form of a slurry.

The fine particles produced by the second production mode have a narrow particle size distribution, that is, a uniform particle size, and have few coarse particles mixed therein. Specifically, they have an average particle size of 3 to 70 nm.

By the second production mode also, for example, oxide fine particles, more specifically fine particles of simple oxides, composite oxides, double oxides, oxide solid solutions and so on can be produced. Further, fine particles obtained by chemical reactions starting from metals, alloys, hydroxides, carbonate compounds, halides, sulfides, nitrides, carbides, hydrides, metal salts or organometallic compounds as a raw material can be produced.

Then, as a third production mode corresponding to the processes for producing fine particles according to the first and second aspects of the present invention, a process for producing fine particles from a dissolution solution, which is prepared by dissolving a raw material in a solvent, by the use of the fine particle producing apparatus of the first embodiment is explained. Note that the raw material (raw material or materials for producing fine particles) used in the third production mode may be solid, liquid, or in any other form.

The fine particle producing apparatus used in the third production mode also may be of the same construction as that of the fine particle producing apparatus of the first embodiment (see FIG. 1) used in the first production mode. Thus, the process for producing fine particles of the third production mode using the above-mentioned fine particle producing apparatus is explained below.

In the third production mode, first, a raw material is dissolved in a solvent to prepare a dissolution solution, i.e., a so-called solution. As mentioned above, the dissolution solution as used herein refers to a solution that is in an ionized state, inclusive of one which is in a supersaturated state in which precipitates are present. The solvents that can suitably be used for the preparation include water, acids, alkalis, alcohols, ketones, and ethers. While the raw material is limited depending on the solvent to be used because it is to be dissolved in the solvent, nitrates, acetates, ammonium salts, hydroxides, metal alkoxides, organometallic complexes and so on can be used. In this regard, it is preferable to use a metal salt or metal alkoxide as a raw material to form fine particles thereof.

When a dissolution solution is prepared as mentioned above, the concentration of the dissolution solution can be increased to the saturation solubility, or a concentration exceeding that concentration to some extent (supersaturated state). Also, a combustible material can be added to the dissolution solution to make a mixture. The mixing ratio of the raw material to the solvent and the combustible material is as mentioned above.

When a metal salt or metal alkoxide is used as a raw material, it is dissolved in a solvent to prepare a dissolution solution.

The concentration of the metal salt or metal alkoxide in the dissolution solution may be increased to the saturation solubility. Also, a combustible material can be added to the dissolution solution to make a mixture. The mixing ratio (mass ratio) of the metal salt or metal alkoxide to the solvent and the combustible material may be selected as appropriate. Specifically, the mass ratio between the metal salt or metal alkoxide, the solvent and the combustible material may be set to, for example, 10:50:40.

The metal salt may be selected from ionic compounds each of which contains at least one metal element selected from the group consisting of the elements having atomic numbers of 3 to 6, 11 to 15, 19 to 34, 37 to 52, 55 to 60, 62 to 79, and 81 to 83. Specific examples of the metal salt include aluminum nitrate, zinc nitrate, yttrium nitrate, zirconium nitrate, zirconium acetate, and titanium chloride.

Also, for example, water, methanol, ethanol, acetone or the like may be used as the above-mentioned solvent.

Regarding the metal alkoxide, a desired one may be selected as appropriate. Examples of the metal alkoxide to be dissolved in a solvent include Si-based one (tetraethoxysilane) and Ti-based one (tetraisopropoxysilane). Alcohol solvents (ethanol, propanol, and so on) may be used as the solvent.

When a metal alkoxide is used, alkoxides of various metals such as Li, Na, Cu, Ca, Sr, Ba, Zn, B, Al, Ga, Y, Si, Ge, Pb, P, Sb, V, Ta, W, La, and Nd can be used besides those which are referred to in the description on the preceding production modes.

Regarding the combustible material (combustible solvent), the various ones explained in the description on the preceding production modes can suitably be used. Mixing a combustible material with a metal salt solution results in expansion of a flame due to combustion of the combustible material itself in addition to an increase in the reaction temperature, which leads to promotion of the reaction, so that the thermal plasma flame used for the reaction is more stabilized and thus a stable, continuous operation can be practiced.

Similar to the above, the dissolution solution prepared by mixing a metal salt that is a material or materials for producing fine particles, a solvent and a combustible material is supplied to the container 14b of the material supply unit 14 shown in FIG. 1 and sufficiently stirred with the stirrer 14c. This maintains the dissolution solution in a state in which the metal salt and the combustible material are uniformly dispersed. The solution may be prepared in the material supply unit 14 by supplying the metal salt, solvent and combustible material to the container 14b.

Subsequently, fine particles are formed by following the process for producing fine particles described above as the production mode in which the powdery raw material is used in the form of a slurry.

The fine particles produced by the third production mode have a narrow particle size distribution, that is, a uniform particle size, and have few coarse particles mixed therein. Specifically, they have an average particle size of 3 to 100 nm. By the third production mode, for example, fine particles of metals, simple oxides, composite oxides, double oxides, oxide solid solutions, simple nitrides, composite nitrides, simple carbides, or composite carbides can be produced.

In the third production mode, use of a solution prepared by dissolving a powder material in a solvent enables a metal that serves as a raw material or materials for producing fine particles to be dispersed with ease, with the dispersibility being very high. Therefore, fine particles having a minuter and uniform particle size can be produced.

Then, as a fourth production mode corresponding to the process for producing fine particles according to the first aspect of the present invention, a process for producing fine particles by dispersing a powdery raw material (in, for example, a carrier gas without using solvents or the like) and introducing the dispersed material into a thermal plasma flame by the use of the fine particle producing apparatus of the first embodiment is explained.

The fine particle producing apparatus used in the fourth production mode corresponding to the process for producing fine particles according to the present aspect may be of the same construction as that of the fine particle producing apparatus used in the first to third production modes except for the material supply unit. In addition, forming of fine particles after the powdery raw material is supplied into the thermal plasma flame is carried out by following the processes of the latter three production modes.

In the fourth production mode, fine particles are produced by changing the material supply unit 14 of the fine particle producing apparatus used in the above-mentioned first to third production modes (see FIG. 1) into that suitable for the use of a powdery raw material as such. However, in this mode also, the powdery raw material must have been dispersed when supplied into the thermal plasma flame as is the case with the first to third production modes.

Thus, the material supply unit used in the present production mode is preferably one that is capable of supplying a powdery raw material into the thermal plasma flame inside a plasma torch quantitatively while maintaining the powdery raw material in a dispersed state (state of so-called primary particles). As a material supply unit having such a function, for example, the powder dispersing apparatus as disclosed in JP 3217415 B may be used.

Hereinafter, the fine particle producing apparatus used in the present production mode is explained first.

FIG. 3 shows a general construction of a material supply unit 140 adapted for the case where a powdery raw material is used as the material or materials for producing fine particles. The material supply unit 140 shown in FIG. 3 is mainly constructed of a storage tank 142 that stores the powdery raw material, a screw feeder 160 that quantitatively transports the powdery raw material, and a dispersing section 170 that disperses fine particles of the powdery raw material transported by the screw feeder 160 into the state of primary particles before the particles are finally spread.

The storage tank 142 is provided with exhaust piping and air supply piping, neither of which is shown in the figure. The storage tank 142 is a pressure vessel sealed with an oil seal or the like and is constructed so that the atmosphere inside it can be controlled. In the top of the storage tank 142 is provided a supply port (not shown) for supplying a powdery raw material, through which a powdery raw material 144 is supplied to the inside of the storage tank 142, and stored.

Inside the storage tank 142 are provided an agitation shaft 146 and agitation vanes 148 connected to the shaft in order to prevent agglomeration of the powdery raw material 144 stored. The agitation shaft 146 is so arranged through an oil seal 150a and a bearing 152a that it may be rotatable in the storage tank 142. The end of the agitation shaft 146 outside the storage tank 142 is connected to a motor 154a, the rotation of which is controlled by a controlling apparatus (not shown).

At the bottom of the storage tank 142 is provided the screw feeder 160 that enables quantitative transportation of the powdery raw material 144. The screw feeder 160 includes a screw 162, a shaft 164 of the screw 162, a casing 166, and a motor 154b which is a rotation power source for the screw 162. The screw 162 and the shaft 164 are positioned at the bottom of the storage tank 142 so that they may extend across the inside of the tank. The shaft 164 is so arranged through an oil seal 150b and a bearing 152b that it may be rotatable in the storage tank 142.

The end of the shaft 164 outside the storage tank 142 is connected to the motor 154b, whose rotation is controlled by a controlling apparatus (not shown). The casing 166 constitutes a tubular passage connecting an opening in a lower part of the storage tank 142 and the dispersing section 170 described below with each other, and the screw 162 is located in the casing as such. The casing 166 extends midway inside the dispersing section 170 described below.

As shown in FIG. 3, the dispersing section 170 has an outer tube 172 outfitted and fixed to a part of the casing 166, and a rotating brush 176 set on a tip portion of the shaft 164, and is capable of subjecting the powder material 144 quantitatively transported by the screw feeder 106 to primary dispersion.

The end of the outer tube 172 opposite with the end outfitted and fixed to the casing is of a frusto-conical shape, and has a powder dispersing chamber 174 formed inside thereof as a space also having a frusto-conical shape. Also, a transportation duct 182 that transports the powder material dispersed by the dispersing section 170 is connected to the frusto-conical end.

The casing 166 is open at the tip thereof and the shaft 164 extends beyond the open tip to the powder dispersing chamber 174 inside the outer tube 172, with the rotating brush 176 being provided on the tip portion of the shaft 164. In the side wall of the outer tube 172 is provided a gas supply port 178. The space defined by the outer surface of the casing 166 and the inner surface of the outer tube 172 serves as a gas passage 180 through which the supplied gas passes.

The rotating brush 176 is a member with bristles made of a relatively flexible material such as nylon or a hard material such as steel wire, and is formed by densely setting the bristles on the shaft 164 so that they may extend radially from the shaft and exist over a range from the inside of the casing 166 near the tip portion thereof to the inside of the powder dispersing chamber 174. The set bristles have such a length that they abut the inner surface of the casing 166 at their tips.

In the dispersing section 170, the gas for dispersion and transportation (carrier gas) from a pressure gas supplying source, which is not shown, is jetted through the gas supply port 178 and the gas passage 180 in the radial direction for the rotating brush 176 from outside toward the brush 176, and the powdery raw material 144 quantitatively transported is dispersed into primary particles by passing through the bristles of the rotating brush 176.

The powder dispersing chamber 174 is formed such that the angle between the generatris of the frusto-conical shape of the chamber and the shaft 164 of the screw 162 is about 30°. A smaller volumetric capacity of the powder dispersing chamber 174 is preferable since, with a larger capacity, the powdery raw material 144 dispersed by the rotating brush 176 will adhere to the inner surface of the powder dispersing chamber 174 before it enters the transportation duct 182 and such a material will be re-scattered, and, as a consequence, the dispersed powdery raw material may not be supplied at a constant concentration.

The transportation duct 182 is connected at its one end to the outer tube 172 and at the other end to the plasma torch 12. The transportation duct 182 has a length at least 10 times larger than its diameter, and preferably has such a diameter at least in a part of the length that the gas stream containing the dispersed powdery raw material flows at a rate of 20 m/sec or more. This prevents agglomeration of the powdery raw material 144 dispersed into the state of primary particles in the dispersing section 170 and enables to spread the powdery raw material 144 in the plasma torch 12 while maintaining the dispersed state thereof.

The fine particle producing apparatus used in the present production mode has the same construction as that of the apparatus used in the first to third production modes except that the material supply unit 140 as above is connected to the plasma torch 12 as shown in FIGS. 1 and 2, and the process for producing fine particles of the present production mode can be practiced using the apparatus as such.

Then, the fourth production mode corresponding to the process for producing fine particles according to the present aspect is explained.

A combustible material, which makes the thermal plasma flame stable by the combustion of its own, may be added to and mixed with the powdery raw material used as the material or materials for producing fine particles. In this case, the mass ratio of the powdery raw material to the combustible material may be selected as appropriate. Particularly, the mass ratio of the powdery raw material to the combustible material may be set to 95:5.

The powdery raw material is a powder material which can evaporate in the thermal plasma flame, and preferably has a particle size of 10 μm or less.

The powdery raw material used is almost the same as in the production modes described above. In other words, the material to be used may be selected as appropriate from simple oxides, composite oxides, double oxides, oxide solid solutions, metals, alloys, hydroxides, carbonate compounds, halides, sulfides, nitrides, carbides, hydrides, metal salts and organometallic compounds that contain at least one element selected from the group consisting of the elements having atomic numbers of 3 to 6, 11 to 15, 19 to 34, 37 to 52, 55 to 60, 62 to 79, and 81 to 83.

Specific examples include graphite, titanium oxide, aluminum oxide, aluminum, silica, and silicone.

As the combustible material, those which are composed of elements that do not remain in the formed fine particles as impurities, such as C, H, O and N, may suitably be used. Specifically, citric acid, glycerol, or ethylene glycol can be used. However, the present invention is not limited thereto.

The mixture of the powdery raw material and combustible material as described above is sufficiently stirred so that a uniform mixture may be obtained and the stirred mixture is charged into the storage tank 142 of the material supply unit 140. Sufficient stirring may be carried out after the powdery raw material and combustible material are charged into the storage tank 142.

The mixture is then spread into the thermal plasma flame 24 in the plasma torch 12. The powdery raw material thus spread is evaporated to make a vapor-phase mixture, and the vapor-phase mixture is quenched in the chamber 16 so as to form fine particles from the vapor-phase mixture.

In the fourth production mode corresponding to the process for producing fine particles according to the present aspect, the powdery raw material is spread into the thermal plasma flame 24 together with the combustible material and, as a consequence, the particles thereof can be dispersed with ease at a higher temperature, thus enabling fine particles having a minuter and uniform particle size to be produced.

The constructions of the first to fourth production modes corresponding to the processes for producing fine particles according to the first and second aspects of the present invention are basically as described above.

The process for producing fine particles according to the third aspect of the present invention and the fine particle producing apparatus according to the fifth aspect of the present invention are explained referring to FIGS. 2 to 6B first.

Figure 4:
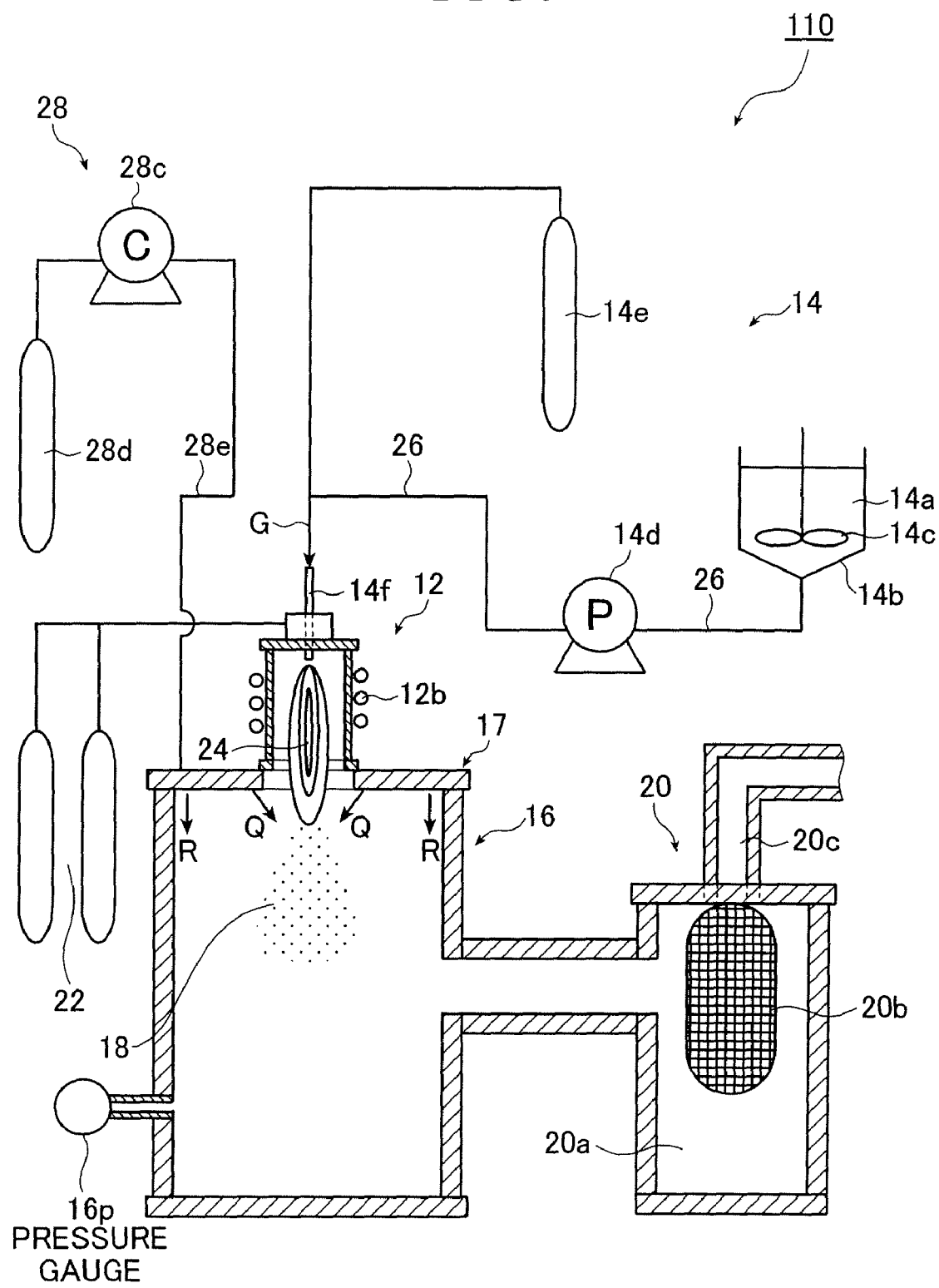
FIG. 4 is a schematic cross-sectional view showing an overall construction of another embodiment of the fine particle producing apparatus according to the present invention.
Figure 5:
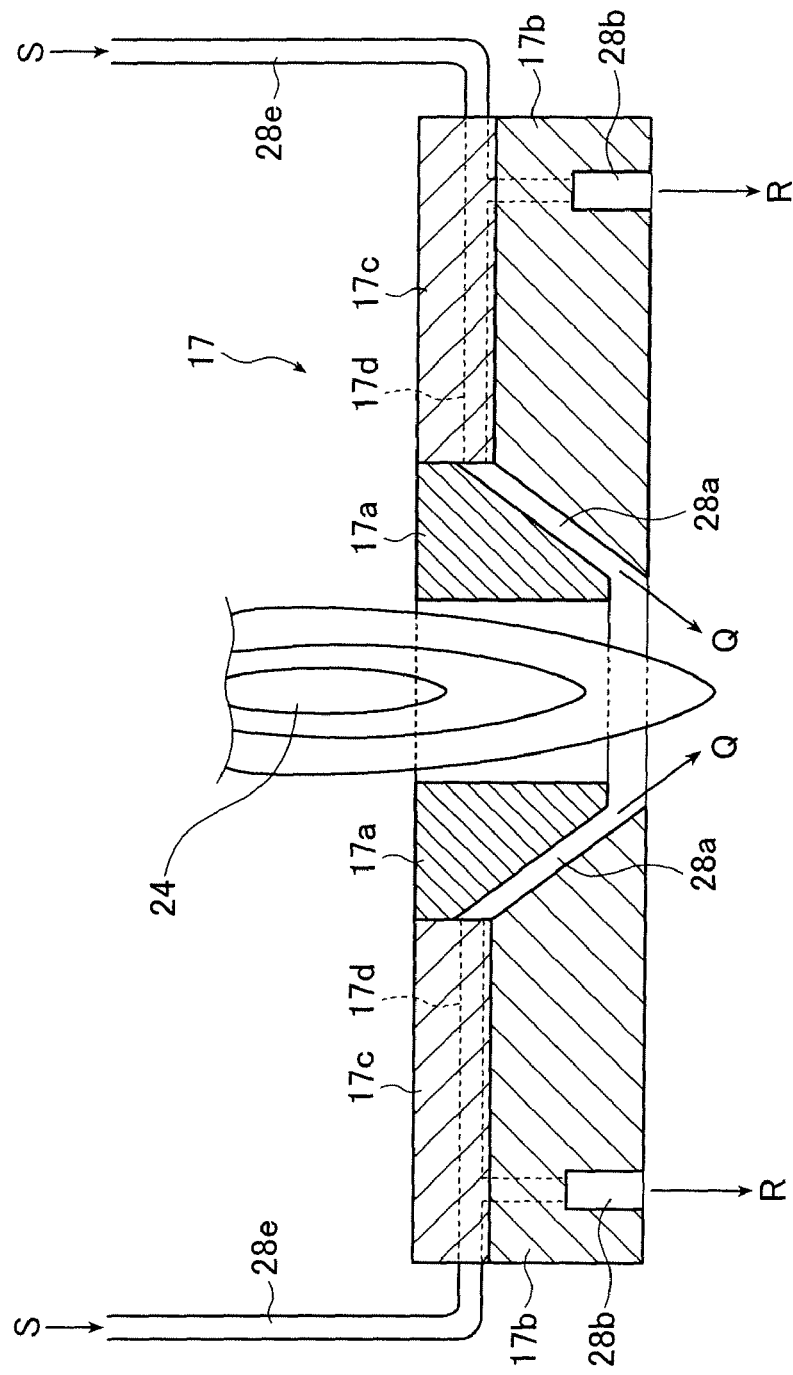
FIG. 5 is an enlarged cross-sectional view showing the top plate of the chamber in the fine particle producing apparatus shown in FIG. 4, and particularly the vicinity of the gas ejection nozzle provided in the top plate.

FIG. 4 is a schematic cross-sectional view showing an overall construction of a second embodiment of the fine particle producing apparatus of the invention, which is the apparatus according to the fifth aspect of the present invention that exploits the process for producing fine particles according to the third aspect of the present invention. FIG. 5 is an enlarged cross-sectional view showing the top plate of the chamber in the fine particle producing apparatus shown in FIG. 4, and particularly the vicinity of the gas ejection nozzle provided in the top plate. Here, a fifth production mode, which is a process for producing fine particles from a slurry by the use of the fine particle producing apparatus shown in FIG. 4, is explained as a typical example. However, it is needless to say that the present invention is not limited thereto.

A fine particle producing apparatus 110 of the second embodiment shown in FIG. 4 has quite the same construction as that of the fine particle producing apparatus 10 of the first embodiment shown in FIG. 1 except that it is provided with a gas supply unit 28, and includes a chamber 16 with a top plate 17 of a different structure. Therefore, like components are designated by like reference numerals and no more described in detail. Explanation will be made mainly on the differences.

The fine particle producing apparatus 110 shown in FIG. 4 includes a plasma torch 12 for generating a thermal plasma flame 24, a material supply unit 14 for supplying a material or materials for producing fine particles to the inside of the plasma torch 12, the chamber 16 serving as a cooling tank for forming fine particles 18, a recovery section 20 for recovering the formed fine particles 18, and the gas supply unit 28 for supplying or introducing a gas for cooling into the chamber 16 and ejecting the gas toward the thermal plasma flame 24.

In this embodiment, the thermal plasma flame 24 is generated inside the plasma torch 12, and the material or materials for producing fine particles are supplied from the material supply unit 14 as a slurry 14a, which is sprayed through a supply tube 14f to make it into the form of droplets, with the slurry in droplet form being supplied into the generated thermal plasma flame 24 and then evaporated so as to make a vapor-phase mixture, as is the case with the first embodiment as described above.

The material supply unit 14 in the second embodiment, which may be the same as the material supply unit 14 in the first embodiment shown in FIG. 1, similarly disperses the material or materials for producing fine particles (powdery raw material) and supplies the dispersed material into the plasma torch 12. In the fifth production mode corresponding to the present aspect, however, unlike the first production mode corresponding to the first aspect as described before, any slurry can be used as far as it is prepared by dispersing a powdery raw material in a dispersion medium. That is, the slurry 14a prepared by adding a powdery raw material to a dispersion medium and stirring the mixture is supplied from the material supply unit 14 into the plasma torch 12. In this mode, the slurry 14a may be a slurry obtained by simply adding a powdery raw material to a dispersion medium and stirring the mixture, a slurry obtained by adding a powdery raw material to a combustible material (combustible solvent) and stirring the mixture, a slurry obtained by adding a powdery raw material to a dispersion medium and a combustible material and stirring the mixture, or a slurry obtained by adding a powdery raw material to a dispersion medium followed by stirring, and further adding a combustible material followed by stirring the mixture.

The fine particle producing apparatus 110 according to the present aspect, like the fine particle producing apparatus 10 shown in FIG. 1, includes the chamber 16 that serves as a cooling tank for quenching the vapor-phase mixture made in the thermal plasma flame 24 in the plasma torch 12 immediately after its making so as to form the fine particles 18. To realize a higher quality and a higher productivity of the fine particles 18 formed, that is, to make the particle size of the fine particles minuter and uniform and to prevent agglomeration of the formed fine particles 18, this embodiment characteristically includes the gas supply unit 28 whose use is contemplated mainly to quench the vapor-phase mixture. Hereinafter, the gas supply unit 28 is explained.

The gas supply unit 28 shown in FIGS. 4 and 5 includes a gas ejection nozzle 28a that ejects a gas toward the tail of the thermal plasmas flame 24 at a predetermined angle, a gas ejection nozzle 28b that ejects a gas along the side wall of the chamber 16 from above downwards, a compressor 28c that pressurizes the gas to be supplied into the chamber 16, a gas supplying source 28d for the gas to be supplied into the chamber 16, and a tube 28e that connects these members with one another. The compressor 28c may be a blower.

The compressor 28c and gas supplying source 28d are connected to the top plate 17 of the chamber 16 through the tube 28e. The tail of the thermal plasma flame 24 refers to the tip portion of the thermal plasma flame 24 opposite with the plasma gas supply port 12c, that is, the end portion of the thermal plasma flame 24.

As shown in FIG. 5, the gas ejection nozzles 28a and 28b are formed in the top plate 17 of the chamber 16. The top plate 17 includes an inner top plate part 17a having a frusto-conical shape with an upper portion thereof being cylindrical, an outer top plate part 17b provided with a frusto-conical hole, and an upper outer top plate part 17c having a moving mechanism for vertically moving the inner top plate part 17a.

The portions of the inner top plate part 17a and the upper outer top plate part 17c which come into contact with each other (upper cylindrical portion for the inner top plate part 17a) are threaded, so the position of the inner top plate part 17a can be changed in the vertical direction by rotating the inner top plate part 17a, and the inner top plate part 17a can be adjusted in distance from the outer top plate part 17b. Further, the slope of the conical portion of the inner top plate part 17a is the same as the slope of the conical portion of the hole of the outer top plate part 17b, which means that the two parts are constructed such that they can be combined with each other.

The gas ejection nozzle 28a is a gap, that is, a slit formed between the inner top plate part 17a and the outer top plate part 17b. The width of the slit is adjustable and the slit is formed circumferentially and concentric with the top plate. The gas ejection nozzle 28a may be of any form as far as it can eject the gas toward the tail of the thermal plasma flame 24, that is to say, it is not limited to the slit form as described above and may be in the form of, for example, a plurality of holes arranged circumferentially.

Inside the upper outer top plate part 17c is provided a gas feed passage 17d through which the gas sent via the tube 28e passes. The gas passes through the gas feed passage 17d and is sent to the gas ejection nozzle 28a, which is a slit defined by the inner top plate part 17a and the outer top plate part 17b as described above. The gas sent to the gas ejection nozzle 28a is ejected toward the tail (end portion) of the thermal plasma flame in the direction indicated by an arrow Q in FIGS. 4 and 5 in a predetermined supply amount and at a predetermined angle as mentioned above.

The predetermined supply amount of the gas for cooling to be supplied into the chamber 16 in the present invention is as follows: In the present invention, a supply amount sufficient to quench the vapor-phase mixture is, for example, such that the gas supplied into the chamber 16 which provides a space necessary for quenching of the vapor-phase mixture has an average flow rate (in-chamber flow rate) of preferably 0.001 to 60 m/sec, and more preferably 0.5 to 10 m/sec, in the chamber 16. This is a supply amount of a gas sufficient to quench the vapor-phase mixture made by spraying and evaporating the raw material in the thermal plasma flame 24, to form fine particles, and to prevent agglomeration of the formed fine particles due to the collision with one another.

This supply amount is required to be an amount sufficient to quench the vapor-phase mixture to condense/solidify it, and also an amount sufficient to dilute the vapor-phase mixture so that fine particles may not agglomerate as a result of collision with one another immediately after they are formed by condensation/solidification. Accordingly, the value of the supply amount is to be determined as appropriate depending on the shape and size of the chamber 16.

However, it is preferable that the supply amount be controlled so as not to inhibit the stabilization of the thermal plasma flame 24.

Figure 6A:
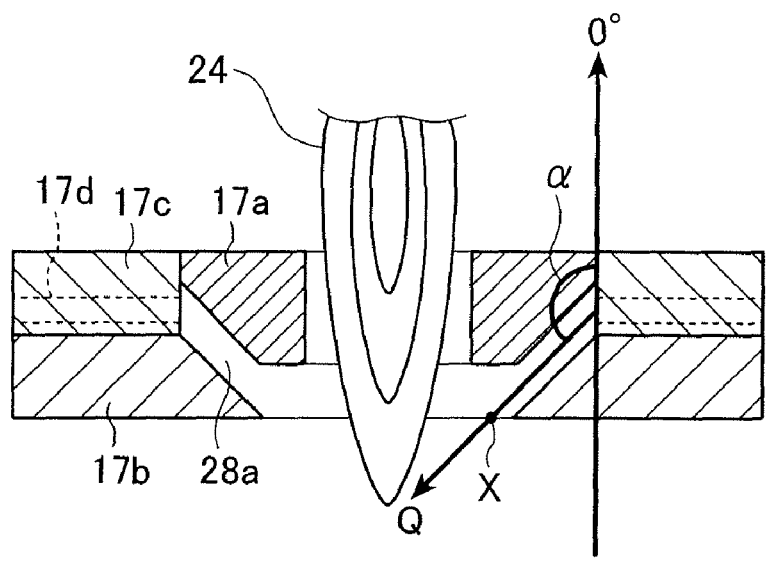
FIGS. 6A and 6B are a vertical cross-sectional view of the top plate of the chamber shown in FIG. 5 along the central axis of the plate and a bottom plan view of the top plate, respectively, each presented for illustration of an angle at which a gas is to be ejected.
Figure 6B:
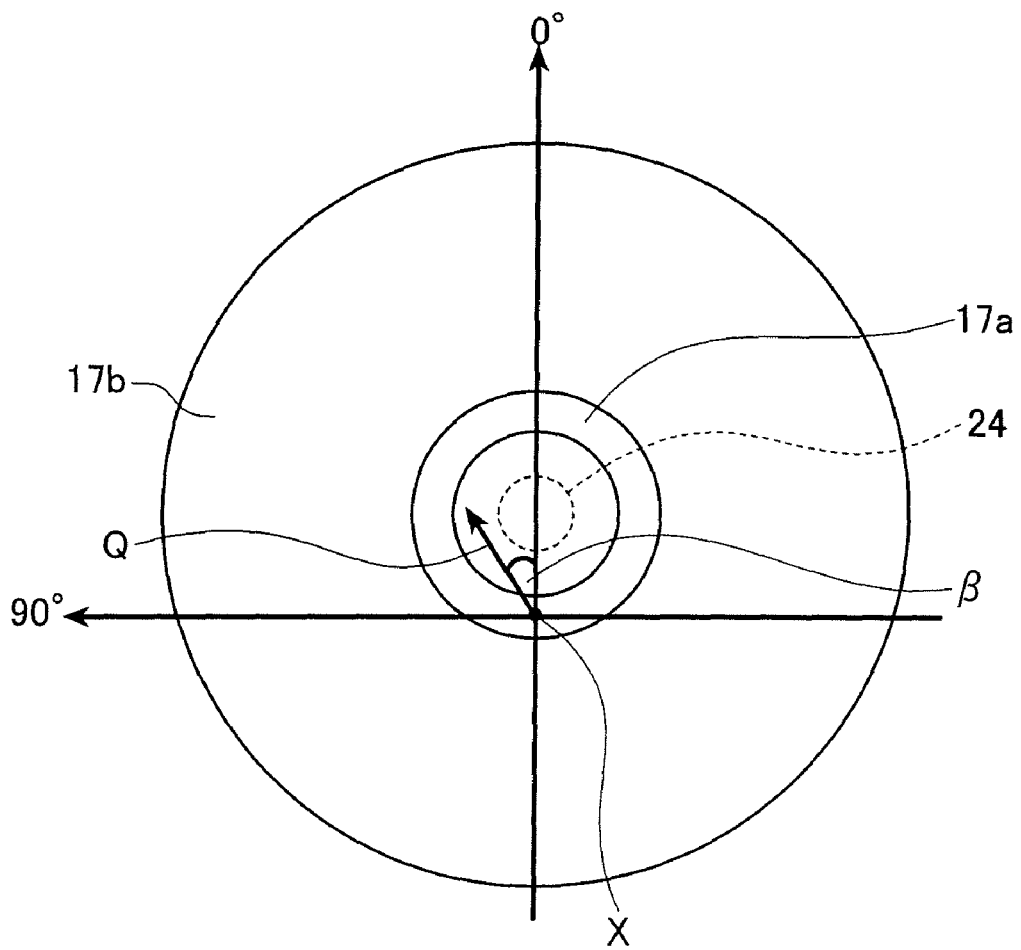

Next, referring to FIGS. 6A and 6B, the predetermined angle at which the gas is ejected toward the tail of the thermal plasma flame 24 in the case where the gas ejection nozzle 28a is in the form of a slit is explained. FIG. 6A is a vertical cross-sectional view of the top plate 17 of the chamber 16 along the central axis of the plate. FIG. 6B is a bottom plan view of the top plate 17. Note that in FIG. 6B, a view taken along a direction perpendicular to the direction along which the view shown in FIG. 6A is taken is shown. The point X in each of FIGS. 6A and 6B is an ejection point at which the gas sent from the gas supplying source 28d (see FIG. 4) through the gas feed passage 17d is ejected from the gas ejection nozzle 28a into the chamber 16. The gas ejection nozzle 28a is actually a circular slit, so that the gas as ejected forms a gas stream in the form of a band. Therefore, the point X is an imaginary point of ejection.

As shown in FIG. 6A, when, assuming the center of the opening of the gas feed passage 17d as the origin, the vertically upward direction from the origin gives an angle of 0°, and the counterclockwise direction in the plane of drawing is the positive direction, the angle at which a gas is ejected from the gas ejection nozzle 28a in the direction indicated by an arrow Q is the angle as designated by $\alpha$. The angle $\alpha$ is defined with respect to the direction from the initial portion to the tail (end portion) of the thermal plasma flame as above.

Further, as shown in FIG. 6B, when, assuming the above-mentioned imaginary ejection point X as the origin, the direction from the origin toward the center of the thermal plasma flame 24 gives an angle of 0°, and the counterclockwise direction in the plane of drawing is the positive direction, the angle at which a gas is ejected from the gas ejection nozzle 28a in the direction indicated by an arrow Q is the angle as designated by $\beta$ in a plane perpendicular to the direction from the initial portion to the tail (end portion) of the thermal plasma flame 24. The angle $\beta$ is defined with respect to the central portion of the thermal plasma flame as above in a plane orthogonal to the direction from the initial portion to the tail (end portion) of the thermal plasma flame.

Using the above-mentioned angle $\alpha$ (usually an angle in the vertical direction) and angle $\beta$ (usually an angle in the horizontal direction), the predetermined angle, that is, the direction in which the gas is supplied into the chamber 16 is preferably set such that the angle $\alpha$ is in the range of $90° < \alpha < 240°$ (more preferably in the range of $100° < \alpha < 180°$, and most preferably $\alpha = 135°$) with respect to the tail (end portion) of the thermal plasma flame 24 that is located in the chamber 16, and the angle $\beta$ is in the range of $-90° < \beta < 90°$ (more preferably in the range of $-45° < \beta < 45°$, and most preferably $\beta = 0°$).

As described above, by the gas ejected in the predetermined amount and at the predetermined angle toward the thermal plasma flame 24, the vapor-phase mixture is quenched to form the fine particles 18. The gas ejected into the chamber 16 at the predetermined angle as described above does not always reach the tail of the thermal plasma flame 24 at the angle at which the gas is ejected due to the influence of turbulent flow or the like generated in the chamber 16. However, it is preferable to determine the ejection angle as described above in order to cool the vapor-phase mixture effectively and stabilize the thermal plasma flame 24 to allow an efficient operation of the fine particle producing apparatus 110 as shown in FIG. 4. The ejection angle can be determined appropriately taking such conditions as the size of the apparatus and the size of the thermal plasma flame into consideration.

On the other hand, the gas ejection nozzle 28b is a slit formed in the outer top plate part 17b. The gas ejection nozzle 28b is an ejection nozzle for the gas to be ejected along the side wall of the chamber 16 from above downwards to prevent adhesion of the formed fine particles 18 to the inner surface of the chamber 16. The gas ejection nozzle 28b is arranged in the vicinity of the side wall of the chamber 16 and is a circular slit formed concentrically with the top plate 17. However, the shape of the slit is not limited to the above-mentioned one as far as the shape of the slit is suitable for satisfactorily achieving the above-mentioned object, that is, the shape of the slit allows the gas stream formed by the gas ejected from the gas ejection nozzle 28b to cover the side wall of the chamber 16 and thereby prevent the fine particles 18 from adhering to the inside of the chamber 16.

A part of the gas introduced by the gas supplying source 28d into the inside of the top plate 17 (more particularly, the outer top plate part 17b and the upper outer top plate part 17c) through the tube 28e as indicated by an arrow S is ejected from the gas ejection nozzle 28b through the gas feed passage 17d, ejected along the side wall of the chamber 16 in the direction indicated by an arrow R in FIG. 5. The amount of the gas ejected from the gas ejection nozzle 28b will be sufficient if it can prevent adhesion of the fine particles 18 to the inside of the chamber 16.

A pressure gauge 16p is provided on the side wall of the chamber 16 shown in FIG. 4 in order to monitor the pressure in the chamber 16, and is also used to detect a change in the amount of air supplied into the chamber 16 as mentioned above to control the pressure in the system.

In the fine particle producing apparatus 110 shown in FIG. 4, like the fine particle producing apparatus 10 shown in FIG. 1, the formed fine particles 18 are recovered in the recovery section 20 provided on the side of the chamber 16.

Basic construction of the fine particle producing apparatus of this embodiment is as mentioned above. Then, a process for producing fine particles from a slurry is explained as the fifth production mode of the process for producing fine particles according to the present invention with reference to this fine particle producing apparatus while stating the operation of the apparatus.

The fifth production mode of the process for producing fine particles according to the present invention has similar steps, conditions, and construction to those of the first production mode mentioned above except that a gas is supplied toward the tail of a thermal plasma flame in an amount sufficient to quench the vapor-phase mixture made in the thermal plasma flame, and that a slurry may also be used which is prepared by dispersing a material or materials for producing fine particles in a dispersion medium containing no combustible material. Therefore, detailed explanation on those parts which involve a similar step, condition or construction will be omitted and explanation will be made mainly on different parts.

In the fifth production mode corresponding to the process for producing fine particles according to the present aspect, for example, a powdery raw material as the material or materials for producing fine particles is dispersed in a dispersion medium to prepare a slurry. In this case, the mixing ratio of the powdery raw material to the dispersion medium in the slurry may be set to, for example, 6:4 (60%:40%).

As is the case with the first production mode mentioned above, it is preferable that a combustible material that is combustible by itself be added and mixed. Appropriate selection of the mass ratios between the powdery raw material, dispersion medium and combustible material allows a slurry to be prepared.

Selection of the powdery raw material and dispersion medium, and selection of the combustible material to be added, as well as mass ratios between such, and the method of preparing a slurry may be the same as those in the first production mode.

The slurry 14a thus prepared is charged into the container 14b in the material supply unit 14 and stirred with the stirrer 14c as shown in FIG. 4. This prevents precipitation of the powdery raw material in the dispersion medium and maintains the state of the slurry 14a in which the powdery raw material is dispersed in the dispersion medium.

In the present production mode, like the first production mode as described before, the slurry 14a supplied by the material supply unit 14 is made into the form of droplets using the two-fluid mechanism of the supply tube 14f, and the slurry in droplet form is supplied into the thermal plasma flame 24 and evaporated to make a vapor-phase mixture.

The vapor-phase mixture obtained by evaporating the slurry 14a in the thermal plasma flame 24 is quenched in the chamber 16 to form the fine particles 18. More particularly, the mixture converted into a vapor phase in the thermal plasma flame 24 is quenched by the gas ejected through the gas ejection nozzle 28a in the direction indicated by an arrow Q toward the thermal plasma flame 24 at a predetermined angle and in a predetermined supply amount to form the fine particles 18.

If fine particles agglomerate due to the collision with one another immediately after they are formed, non-uniformity in particle size will occur, leading to a decrease in quality. In contrast, in the process and apparatus for producing fine particles according to the present aspects, the gas ejected through the gas ejection nozzle 28a in the direction indicated by the arrow Q toward the tail (end portion) of the thermal plasma flame at a predetermined angle and in a predetermined supply amount dilutes the fine particles 18 to prevent their collision and hence agglomeration. That is, the gas ejected from the gas ejection nozzle 28a quenches the above-mentioned vapor-phase mixture and further prevents agglomeration of the formed fine particles, thereby effecting both of the decrease in particle size and the uniformization of particle size. This is an important feature of the present invention.

The gas ejected through the gas ejection nozzle 28a exerts not a little adverse influence on the stability of the thermal plasma flame 24. However, to continuously run the whole apparatus, it is necessary to stabilize the thermal plasma flame. For this purpose, the gas ejection nozzle 28a in the fine particle producing apparatus 110 according to the present aspect is formed as a slit having a circular form and the supply amount of the gas can be adjusted by adjusting the width of the slit. Therefore, the gas can be ejected uniformly toward the center. Accordingly, it can be said that the gas ejection nozzle 28a has a shape suitable for stabilizing the thermal plasma flame. This adjustment can also be performed by changing the amount of the gas to be supplied for ejection.

On the other hand, the gas to be introduced is also ejected through the gas ejection nozzle 28b along the inner surface of the chamber 16 from above downwards in the direction indicated by an arrow R in FIG. 4. This prevents adhesion of the fine particles 18 onto the inner surface of the chamber 16 during the recovery of fine particles and increases the yield of the formed fine particles.

Finally, the fine particles formed in the chamber 16 are subjected to the suction with a vacuum pump (not shown) connected to a tube 20c and recovered by a filter 20b in a recovery section 20.

The fine particles produced by the present production mode, like those produced by the first production mode, have a narrow particle size distribution, that is, have a uniform particle size and, moreover, have fewer coarse particles mixed therein. Specifically, the fine particles have an average particle size of 1 to 100 nm.

In the process for producing fine particles according to the present aspect, the gas stream comprising a plasma gas, a carrier gas, and a gas derived from the raw material supplied, which stream is generated by, for instance, the exhausting action of the vacuum pump provided in the recovery section, conducts the vapor-phase mixture to a place sufficiently remote from the thermal plasma flame to realize cooling of the mixture. In addition, the vapor-phase mixture can be quenched by the gas ejected toward the tail (end portion) of the thermal plasma flame.

Further, the above-mentioned ejected gas can prevent agglomeration of the fine particles formed by the quenching and condensation/solidification of the vapor-phase mixture due to their collision with one another. That is, since the production method of the present invention includes a step of quenching the vapor-phase mixture and a step of preventing agglomeration of the formed fine particles, it can produce high-quality, high-purity fine particles having a minute and uniform particle size with high productivity.

When the formed particles are made of a simple oxide, composite oxide, double oxide, hydroxide, phosphate compound, or oxide solid solution, neither a reducing atmosphere nor inert atmosphere is required and air can be used as the above-mentioned gas to be ejected. In this case, fine particles can be produced at low cost as compared with the case where an expensive gas such as argon is used. Also, by using air and increasing the amount of the gas to be introduced into the chamber 16 to enhance the effects of quenching, preventing agglomeration, and preventing adhesion, high-quality, high-purity fine particles can be produced with high productivity.

In the production process of the present mode, like the first production mode mentioned above, the effects of increasing the recovery rate of the formed fine particles, stabilizing the thermal plasma flame, and practicing a stable, continuous operation can be achieved by introducing a combustible material into a dispersion medium, as well as the effect of increasing the mass productivity of fine particles formed can be achieved by making a powdery raw material into the form of a slurry.

A sixth to an eighth production modes each for carrying out the process for producing fine particles according to the third aspect of the present invention are processes for producing fine particles by the use of the fine particle producing apparatus of the second embodiment, with the sixth mode using a colloidal solution, the seventh mode using a solution prepared by dissolving a raw material in a solvent, and the eighth mode dispersing a powdery raw material (in, for example, a carrier gas without using solvents or the like) and supplying the dispersed material into a thermal plasma flame.

The sixth to eighth production modes of the present invention are each different from the fifth production mode mentioned above in that no slurry is used, but are each identical to the fifth mode in that the fine particle producing apparatus 110 of the second embodiment shown in FIG. 4 is used. In addition, they are different from the second to fourth production modes as described before in that the fine particle producing apparatus 110 shown in FIG. 4 is used instead of the fine particle producing apparatus 10 shown in FIG. 1, but are identical to the second to fourth modes in that a colloidal solution is used, that a solution prepared by dissolving a raw material in a solvent is used, and that a powdery raw material is dispersed in a carrier gas and supplied as such into a thermal plasma flame, respectively. Accordingly, the sixth to eighth production modes have similar steps, conditions, and constructions to those of the second to fifth production modes, so that detailed explanation on those parts which involve a similar step, condition or construction will be omitted and explanation will be made mainly on different parts.

In the cases of the sixth and seventh production modes of the present invention, preparation of the colloidal solution and dissolution solution of a powdery raw material to be used in the sixth and seventh production modes can be performed in the same manner as in the second and third production modes, respectively. The supply of the colloidal solution and dissolution solution of the powdery raw material, making of a vapor-phase mixture of the powdery raw material, forming of fine particles by quenching the vapor-phase mixture, recovery of the formed fine particles, and so on can be performed in the same manner (inclusive of conditions for gas supply) as in the fifth production mode.

The eighth production mode of the present invention is different from the fifth production mode mentioned above in that powdery raw material dispersed in a carrier gas containing no combustible material can be used, but dispersion of the powdery raw material in the carrier gas and supply of the dispersed material into a thermal plasma flame in the eighth production mode can be performed in the same manner as in the fourth production mode. Making of a vapor-phase mixture of the powdery raw material, forming of fine particles by quenching the vapor-phase mixture, recovery of the formed fine particles, and so on can be performed in the same manner (inclusive of conditions for gas supply) as in the fifth production mode.

The eighth production mode disperses the powdery raw material in a carrier gas and supplies it as such into a thermal plasma flame in the plasma torch 12 using an fine particle producing apparatus that is obtained by replacing the material supply unit 14 in the fine particle producing apparatus 110 shown in FIG. 4 by the material supply unit 140 shown in FIG. 3.

In the eighth production mode, a mixture of the powdery raw material and the combustible material is sufficiently stirred so that a uniform mixture may be obtained, and the resultant mixture is charged into the storage tank 142 in the material supply unit 140, as shown in FIGS. 3 to 6. Sufficient stirring may be carried out after the powdery raw material and the combustible material are charged into the storage tank 142. The mixture is then spread into the thermal plasma flame 24 in the plasma torch 12. The powdery raw material thus spread is evaporated to make a vapor-phase mixture, and the vapor-phase mixture is quenched by the gas, which is supplied by the gas supply unit 28 and ejected through the gas ejection nozzle 28a at a predetermined angle and in a predetermined supply amount, so as to form fine particles. In the process for producing fine particles according to the present aspect, fine particles having a minute and uniform particle size can be produced with high productivity.

Basic constructions of the fifth to eighth production modes corresponding to the process for producing fine particles according to the third aspect of the present invention and the fine particle producing apparatus according to the fifth aspect of the present invention are as mentioned above.

The process for producing fine particles according to the fourth aspect of the present invention and the fine particle producing apparatus according to the sixth aspect of the present invention are explained referring to FIGS. 2, 3, and 5 to 8 first.

Figure 7:
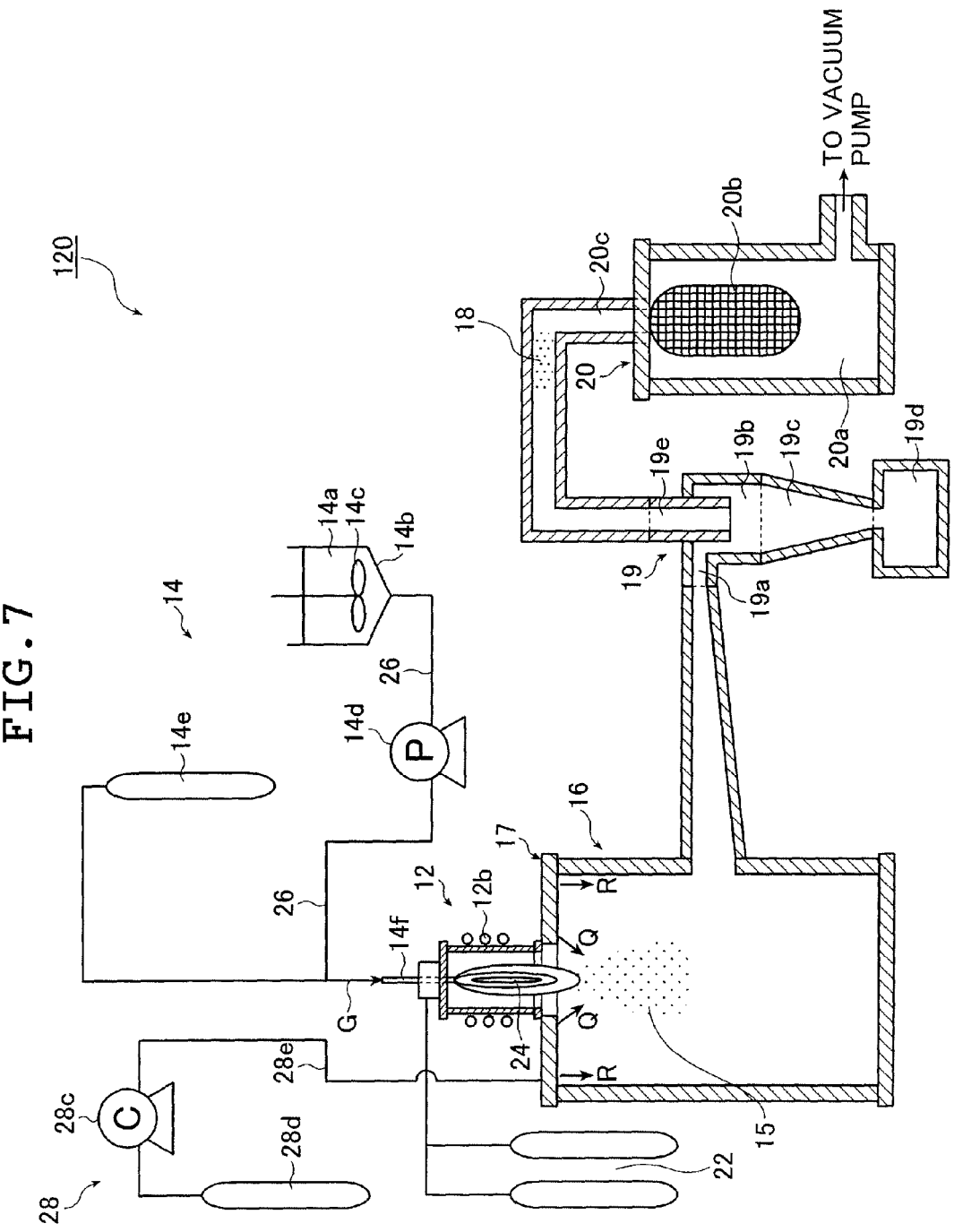
FIG. 7 is a schematic cross-sectional view of an overall construction of yet another embodiment of the fine particle producing apparatus according to the present invention.
Figure 8:
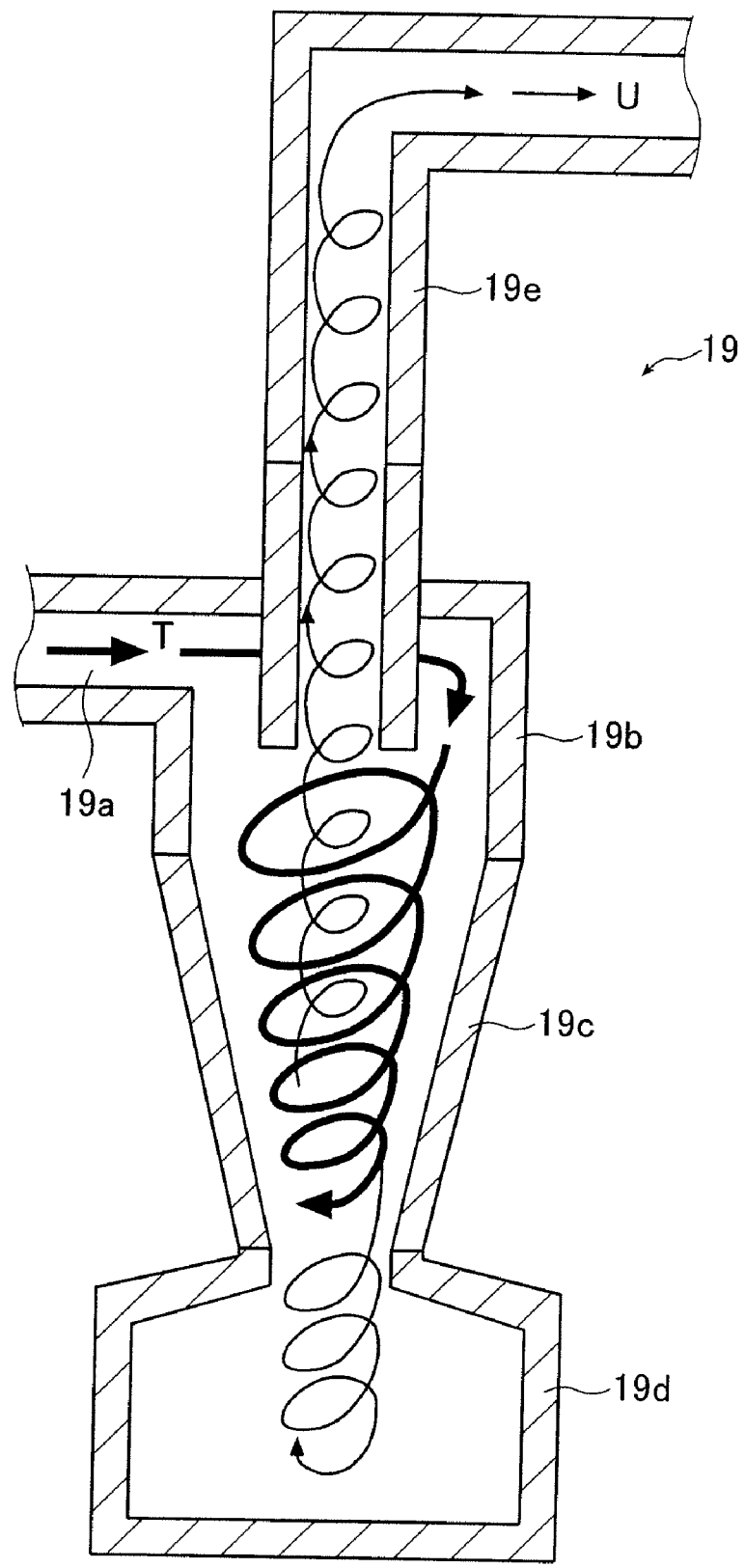
FIG. 8 is an enlarged cross-sectional view showing a cyclone in the fine particle producing apparatus shown in FIG. 7.

FIG. 7 is a schematic cross-sectional view showing an overall construction of a third embodiment of the fine particle producing apparatus of the invention, which is the apparatus according to the sixth aspect of the present invention that practices the process for producing fine particles according to the fourth aspect of the present invention. FIG. 8 is an enlarged cross-sectional view showing a cyclone in the fine particle producing apparatus shown in FIG. 7. Here, explanation is made on a ninth production mode, which is a process for producing fine particles from a slurry by using the fine particle producing apparatus shown in FIG. 7, as a typical example. However, it is needless to say that the present invention is not limited thereto.

A fine particle producing apparatus 120 of the third embodiment as shown in FIG. 7 has quite the same construction as that of the fine particle producing apparatus 110 of the second embodiment as shown in FIG. 4 except that a cyclone 19 is provided between a chamber 16 and a recovery section 20, and therefore like components are designated by like reference numerals and no more described in detail. Explanation will be made mainly on the differences.

The fine particle producing apparatus 120 shown in FIG. 7 includes a plasma torch 12 that generates a thermal plasma flame 24, a material supply unit 14 that supplies a material or materials for producing fine particles to the inside of the plasma torch 12, the chamber 16 serving as a cooling tank for forming fine particles (primary fine particles) 15, the cyclone 19 that removes coarse particles having a particle size equal to or greater than a predetermined particle size from the formed primary fine particles 15, and the recovery section 20 that recovers fine particles (secondary fine particles) 18 having a desired particle size which have been left upon classification by the cyclone 19.

The fine particle producing apparatus 120 as a preferred embodiment further includes a gas supply unit 28 that supplies a gas for cooling into the chamber 16 and ejects the gas toward the thermal plasma flame 24.

In this embodiment, the thermal plasma flame 24 is generated inside the plasma torch 12, and the material or materials for producing fine particles are supplied from the material supply unit 14 as a slurry 14a, which is sprayed through a supply tube 14f to make it into the form of droplets, with the slurry in droplet form being supplied into the generated thermal plasma flame 24 and then evaporated so as to make a vapor-phase mixture, as is the case with the second embodiment as described above.

Similar to that in the second embodiment shown in FIG. 4, the material supply unit 14 in the third embodiment makes the material or materials for producing fine particles (powdery raw material) into a slurry, that is to say, disperses the material, and supplies the dispersed material into the plasma torch 12.

On the other hand, also in the fine particle producing apparatus 120 shown in FIG. 7, the chamber 16 is provided below and adjacent to the plasma torch 12. The slurry 14a sprayed into the thermal plasma flame 24 in the plasma torch 12 is evaporated to make a vapor-phase mixture, and the vapor-phase mixture is quenched in the chamber 16 immediately after its making so as to form the primary fine particles 15. That is, the chamber 16 serves as a cooling tank.

The fine particle producing apparatus 120 shown in FIG. 7 as a preferred embodiment, like the fine particle producing apparatus 110 shown in FIG. 4, is provided with the gas supply unit 28 for quenching the vapor-phase mixture in order to form fine particles more efficiently. While being the same in construction as the gas supply unit shown in FIGS. 4 and 5, the gas supply unit 28 in the fine particle producing apparatus 120 interacts with the cyclone 19, which is a feature of the present invention, so that it is briefly explained again.

As mentioned above, the gas supply unit 28 shown in FIG. 5 and FIG. 7 as well includes the gas ejection nozzle 28a that ejects a gas toward the tail of the thermal plasmas flame 24 (the tip portion of the thermal plasma flame opposite with the plasma gas supply port 12c, that is, the end portion of the thermal plasma flame) at a predetermined angle, the gas ejection nozzle 28b that ejects a gas along the side wall of the chamber 16 from above downwards, the compressor 28c that pressurizes the gas to be supplied into the chamber 16, the gas supplying source 28d for the gas to be supplied into the chamber 16, and the tube 28e that connects these members with one another. The compressor 28c may be a blower.

The gas ejected through the gas ejection nozzle 28a has the effect of quenching the primary fine particles 15 formed in the chamber 16, and additional effects such as of contributing together with the gas ejected through the gas ejection nozzle 28b to the classification of the primary fine particles 15 in the cyclone 19 as will be explained later in detail.

The compressor 28c and gas supplying source 28d are connected to the top plate 17 of the chamber 16 through the tube 28e.

The gas ejection nozzle 28b of the gas supply unit 28 is a slit formed in the outer top plate part 17b of the top plate 17 of the chamber 16, and preferably it can eject a gas in an amount that prevents the formed primary fine particles 15 from adhering to the inner surface of the chamber 16 and permits the gas to have a flow rate sufficient for the classification of the primary fine particles 15 at a given classification point in the cyclone 19 located downstream. A gas is ejected through the gas ejection nozzle 28b along the inner surface of the chamber 16 from above downwards.

The gas supplied from the gas supplying source 28d (see FIGS. 5 and 7) into the inside of the top plate 17 (more particularly, the outer top plate part 17b and the upper outer top plate part 17c) through the tube 28e as indicated by an arrow S is ejected from the gas ejection nozzle 28b (and also from the gas ejection nozzle 28a as described below) through the gas feed passage provided in the plate.

The slurry in droplet form ejected from the material supply unit 14 into the plasma torch 12 is allowed to react to evaporate in the thermal plasma flame 24 so as to make a vapor-phase mixture, which is then quenched in the chamber 16 by the gas ejected from the gas ejection nozzle 28a (refer to an arrow Q) to form the primary fine particles 15. On this occasion, the gas ejected from the gas ejection nozzle 28b (refer to an arrow R) prevents the primary fine particles 15 from adhering to the inner surface of the chamber 16.

On a lower lateral side of the chamber 16 is provided the cyclone 19 for classifying the formed primary fine particles 15 based on a desired particle size. The cyclone 19, as shown in FIG. 8, includes an inlet tube 19a that supplies the primary fine particles 15 from the chamber 16, a cylindrical outer casing 19b connected to the inlet tube 19a and positioned in an upper portion of the cyclone 19, a conical part 19c continuing from a lower portion of the outer casing 19b downward and having a gradually decreased diameter, a coarse particle collecting chamber 19d connected to a lower portion of the conical part 19c for collecting coarse particles having a particle size equal to or greater than the above-mentioned desired particle size, and an inner tube 19e connected to the recovery section 20 and projecting from the outer casing 19b.

A gas stream containing the primary fine particles 15 formed in the chamber 16 is delivered from the inlet tube 19a such that the stream flows along the inner wall of the outer casing 19b, and this gas stream flows in the direction from the inner wall of the outer casing 19b to the conical part 19c as indicated by an arrow T in FIG. 8, thereby forming a swirling downward stream.

The swirling downward stream is accelerated on the inner wall of the conical part 19c and then inverted to provide an upward stream, which is discharged outside the system through the inner tube 19e. On the other hand, part of the gas stream is inverted in the conical part 19c before it flows into the coarse particle collecting chamber 19d, and is discharged outside the system through the inner tube 19e. The swirling stream gives centrifugal force to the particles, and the coarse particles move toward the wall depending on the balance between the centrifugal force and drag. The particles separated from the gas stream come down along the side surface of the conical part 19c and are collected in the coarse particle collecting chamber 19d. In this regard, those fine particles that are under an insufficient centrifugal force are discharged outside the system together with the gas stream inverted on the inner wall of the conical part 19c.

Also, a negative pressure (suction force) is to be generated by the recovery section 20 as explained in detail below and applied through the inner tube 19e. Under the suction force (negative pressure), the fine particles separated from the above-mentioned swirling gas stream are to be attracted as indicated by an arrow U in FIG. 8 and sent to the recovery section 20 through the inner tube 19e.

As an extension of the inner tube 19e, which is an outlet for the gas stream in the cyclone 19, the recovery section 20 for recovering the secondary fine particles 18 is provided. The recovery section 20 includes a recovery chamber 20a, a bug filter 20b provided in the recovery chamber 20a, and a vacuum pump (not shown) connected to the inside of the recovery chamber 20a through a tube provided in a lower portion of the recovery chamber 20a. The fine particles being sent from the cyclone 19 are subjected to suction with the vacuum pump (not shown) and drawn into the recovery chamber 20a so as to recover them as being caught on the surface of the bug filter 20b.

Basic construction of the fine particle producing apparatus of this embodiment is as mentioned above. Explanation is made below on a process for producing fine particles from a slurry as the ninth production mode of the process for producing fine particles according to the present invention, and the fine particles produced by the process, with reference to the fine particle producing apparatus as above while stating the operation of the apparatus.

The ninth production mode of the process for producing fine particles according to the present invention has similar steps, conditions, and construction to those of the fifth production mode mentioned above except that the cyclone 19 is provided and the formed fine particles are classified to prevent inclusion of coarse particles having a particle size equal to or greater than a predetermined particle size. Therefore, detailed explanation on those parts which involve a similar step, condition or construction will be omitted and explanation will be made mainly on different parts.

In the ninth production mode corresponding to the process for producing fine particles according to the present aspect, for example, a powdery raw material as the material or materials for producing fine particles is dispersed in a dispersion medium to prepare a slurry. In this case, selection of the powdery raw material, the dispersion medium and the combustible material as well as mass ratios between such, and the method of preparing a slurry may be quite the same as those in the fifth production mode.

In quite the same manner as in the fifth production mode, the slurry 14a thus prepared is charged into the container 14b in the material supply unit 14 and stirred with the stirrer 14c as shown in FIG. 7. This prevents precipitation of the powdery raw material in the dispersion medium and maintains the state of the slurry 14a in which the powdery raw material is dispersed in the dispersion medium.

In the present production mode, like the fifth production mode as described before, the slurry 14a supplied by the material supply unit 14 is made into the form of droplets using the two-fluid mechanism of the supply tube 14f, and the slurry in droplet form is supplied into the thermal plasma flame 24 and evaporated to make a vapor-phase mixture.

The vapor-phase mixture obtained by evaporating the slurry in the thermal plasma flame 24 is quenched in the chamber 16 to form the primary fine particles 15. More particularly, the mixture converted into a vapor phase in the thermal plasma flame 24 is quenched by the gas ejected through the gas ejection nozzle 28a in the direction indicated by an arrow Q to form the primary fine particles 15.

Therefore, the amount of the gas ejected from the gas ejection nozzle 28a must be a supply amount sufficient to quench the vapor-phase mixture made by evaporation of the material or materials for producing fine particles in the process of forming the primary fine particles. In addition, it is preferable that this amount of the gas along with the amount of the gas ejected from the gas ejection nozzle 28b and the amount of the gas to be supplied into the thermal plasma flame explained below be sufficient to bring about a flow rate that enables classification of the primary fine particles 15 to be performed at a given classification point in the cyclone 19 located downstream, and be such that the stability of the thermal plasma flame is not disturbed.

The ejection amount that is the sum of the amount of the gas ejected from the gas ejection nozzle 28a and the amount of the gas ejected from the gas ejection nozzle 28b is advantageously set to 200% to 5,000% of the amount of the gas to be supplied into the thermal plasma flame. The gas to be supplied into the thermal plasma flame refers to the total of a sheath gas and a central gas that form the thermal plasma flame as well as a gas for spraying the material or materials for producing fine particles (spray gas or carrier gas).

Further, as far as the stability of the thermal plasma flame is not disturbed, the method and position for supplying the gas to be ejected are not particularly limited. In the apparatus of this embodiment, the gas is ejected through a circular slit formed in the top plate 17. However, other methods and positions may be used as far as they allow a reliable supply of the gas on the route from the thermal plasma flame to the cyclone.

The primary fine particles formed in the chamber 16 are finally delivered from the inlet tube 19a of the cyclone 19 along the inner wall of the outer casing 19b together with the gas stream and as a result the gas stream flows along the inner wall of the outer casing 19b as indicated by an arrow T shown in FIG. 8, thereby forming a swirling stream and comes downward. This swirling stream is accelerated on the inner wall of the conical part 19c and then inverted to provide an upward stream, which is discharged outside the system through the inner tube 19e. Part of the gas stream is inverted on the inner wall of the conical part 19c before it flows into the coarse particle collecting chamber 19d, and is discharged outside the system through the inner tube 19e.

The swirling stream gives centrifugal force to the particles, and the coarse particles move toward the wall depending on the balance between the centrifugal force and drag. The particles separated from the gas stream come down along the side surface of the conical part 19c and are collected in the coarse particle collecting chamber 19d. Those fine particles that are under an insufficient centrifugal force are discharged outside the system together with the gas stream inverted on the inner wall of the conical part 19c. On this occasion, the flow rate of the gas stream flowing into the cyclone 19 is preferably 10 m/s or more.

The discharged fine particles are attracted as indicated by an arrow U shown in FIG. 8 under the negative pressure (suction force) applied by the recovery section 20, and reach the recovery section 20 through the inner tube 19e, in which section they are recovered with the bug filter 20b. On this occasion, the inner pressure of the cyclone 19 is preferably atmospheric or less. The particle size of the fine particles to be recovered may be determined depending on the purpose.

Note that in the process for producing fine particles according to the present invention, the method of forming fine particles is not limited to the above-mentioned method and any method may be used.

Also, in the process for producing fine particles according to the present invention, the number of cyclones to be used is not limited to one but may be two or more.

The fine particles produced by the present production mode have a narrow particle size distribution, that is, a uniform particle size, as is the case with the first production mode described above, and include almost no coarse particles having a particle size of 1 µm or more. Specifically, they have an average particle size of 1 to 100 nm.

In the production process of the present mode, like the first production mode, the effects of increasing the recovery rate of the formed fine particles, stabilizing the thermal plasma flame, and practicing a stable, continuous operation can be achieved by introducing a combustible material into a dispersion medium, as well as the effect of increasing the mass productivity of formed fine particles can be achieved by making a powdery raw material into the form of a slurry.

In the present production mode, the fine particles can be classified in a cyclone provided in the apparatus by supplying a gas and appropriately controlling the flow rate of the gas in the apparatus. This is also effective in diluting the condensed/solidified fine particles so that they may not collide with one another and agglomerate, to thereby form finer particles. Accordingly, in the present production mode, coarse particles can be separated at any classification point without changing the reaction conditions but changing the flow rate of the gas or the inner diameter of the cyclone, and, as a consequence, high-quality, high-purity fine particles having a minute and uniform particle size can be produced with high productivity.

Further, in the present production mode, a swirling stream occurs in the cyclone with the result that retention time is prolonged and the fine particles are cooled in the cyclone, which makes it unnecessary to provide fins or a cooling passage used as a cooling mechanism. Accordingly, it is also unnecessary to stop the operation of the apparatus in order to remove the fine particles accumulated among the fins. This makes it possible to prolong the operating time of the apparatus. The cooling effect can be further increased by employing a cyclone of such a structure that it is entirely surrounded with a water jacket.

A tenth to a twelfth production modes each for carrying out the process for producing fine particles according to the fourth aspect of the present invention are processes for producing fine particles by the use of the fine particle producing apparatus of the third embodiment, with the tenth mode using a colloidal solution, the eleventh mode using a solution prepared by dissolving a raw material in a solvent, and the twelfth mode dispersing a powdery raw material (in, for example, a carrier gas without using solvents or the like) and supplying the dispersed material into a thermal plasma flame.

The tenth to twelfth production modes of the present invention are each different from the ninth production mode mentioned above in that no slurry is used, but are each identical to the ninth mode in that the fine particle producing apparatus 120 of the third embodiment shown in FIG. 7 is used. In addition, they are different from the sixth to eighth production modes as described before in that the fine particle producing apparatus 120 shown in FIG. 7 is used instead of the fine particle producing apparatus 110 shown in FIG. 4, but are identical to the sixth to eighth modes in that a colloidal solution is used, that a solution prepared by dissolving a raw material in a solvent is used, and that a powdery raw material is dispersed in a carrier gas and supplied as such into a thermal plasma flame, respectively. Accordingly, the tenth to twelfth production modes have similar steps, conditions, and constructions to those of the sixth to ninth production modes, so that detailed explanation on those parts which involve a similar step, condition or construction will be omitted and explanation will be made mainly on different parts.

In the cases of the tenth and eleventh production modes of the present invention, preparation of the colloidal solution and dissolution solution of a powdery raw material to be used in the tenth and eleventh production modes can be performed in the same manner as in the sixth and seventh production modes, respectively. The supply of the colloidal solution and dissolution solution of the powdery raw material, making of a vapor-phase mixture of the powdery raw material, forming of fine particles by quenching the vapor-phase mixture, recovery of the formed fine particles, and so on can be performed in the same manner (inclusive of conditions for gas supply) as in the ninth production mode.

In the case of the twelfth production mode of the present invention, dispersion of a powdery raw material in a carrier gas and supply of the dispersed material into a thermal plasma flame in the twelfth production mode can be performed in the same manner as in the eighth production mode. Making of a vapor-phase mixture of a powdery raw material, forming of fine particles by quenching the vapor-phase mixture, recovery of the formed fine particles, and so on can be performed in the same manner (inclusive of conditions for gas supply) as in the ninth production mode.

The twelfth production mode disperses the powdery raw material in a carrier gas and supplies it as such into a thermal plasma flame in the plasma torch 12 using an fine particle producing apparatus that is obtained by replacing the material supply unit 14 in the fine particle producing apparatus 120 shown in FIG. 7 by the material supply unit 140 shown in FIG. 3.

Basic constructions of the ninth to twelfth production modes corresponding to the process for producing fine particles according to the fourth aspect of the present invention and the fine particle producing apparatus according to the sixth aspect of the present invention are as mentioned above.

The process for producing fine particles and the fine particle producing apparatus according to the present invention have been explained above referring to the various embodiments and production modes. It is needless to say that the present invention is not limited to such embodiments or production modes, but various modifications and changes may be made without departing from the gist of the present invention.

EXAMPLES

The processes for producing fine particles according to the first to fourth aspects of the present invention and the fine particle producing apparatuses according to the fifth and sixth aspects of the present invention will be explained in detail based on the following examples.

Example 1

An example of the first production mode using the fine particle producing apparatus 10 of the first embodiment shown in FIG. 1 as mentioned above and using a slurry of a raw material is explained.

According to the first production mode of the process for producing fine particles of the present invention, fine particles of aluminum oxide ($Al_2O_3$) were produced. First, a powdery raw material, a dispersant (sorbitan fatty acid ester), and an alcohol as a dispersion medium were mixed. The mixture was charged into a bead mill (manufactured by Kotobuki Industries Co., Ltd.) together with zirconia beads having a diameter of 0.5 mm, and the mixture solution was subjected to grinding. On this occasion, aluminum oxide was used as the powdery raw material and a mixture of powdery raw material:dispersant:alcohol=65:1:34 by mass was used.

To the mixture containing the ground powdery raw material and the dispersant in alcohol was further added kerosene (manufactured by Wako Pure Chemical Industries, Ltd., kerosine (specific gravity: Sp. Gr. 0.78 to 0.79)) as a combustible material, and the mixture was stirred so as to prepare a slurry of an the raw material for fine particles of aluminum oxide. On this occasion, the slurry 14*a* was prepared by varying the amount of kerosene as a combustible solvent [wt %] based on the total mass of the kerosene and the mixture containing the above-mentioned ground powdery raw material and the dispersant in alcohol among 0 [wt %], 15 [wt %] and 30 [wt %].

Argon-oxygen thermal plasma flame was generated by applying a radio-frequency voltage of about 4 MHz and about 80 kVA to the radio-frequency oscillation coil 12*b* of the plasma torch 12 and using a mixed gas of 40 liters/min of argon gas and 50 liters/min of oxygen as a plasma gas. The reaction temperature was controlled so that it might be about 8,000° C. and a spray gas of 10 liters/min was supplied from the spray gas supplying source 14*e* of the material supply unit 14.

The slurry of aluminum oxide ($Al_2O_3$) together with argon gas as the spray gas was introduced into the thermal plasma flame 24 in the plasma torch 12.

Figure 9:
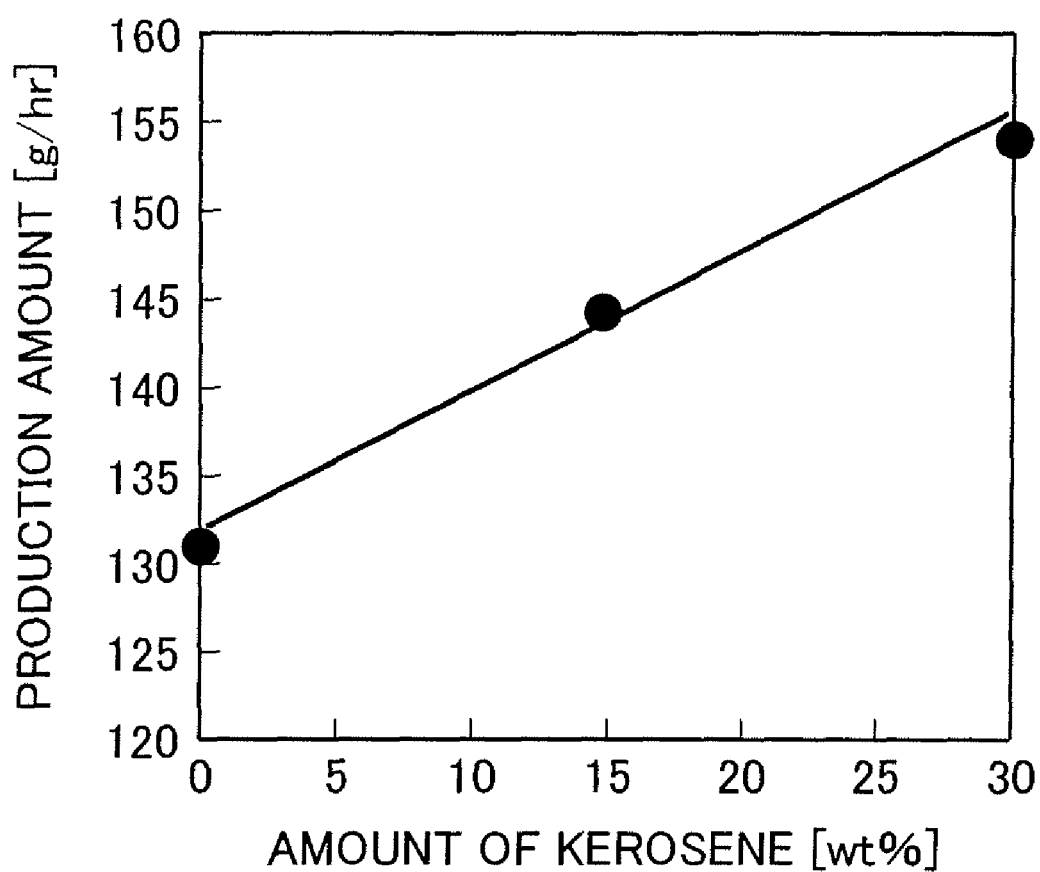
FIG. 9 is a graph representing the relationship between the addition amount of kerosene [wt %] and the recovery amount of fine particles [g/hr] in Example 1 of the present invention.

The fine particles thus formed were measured on an X-ray diffractometer. The results confirmed that the fine particles were made of aluminum oxide. FIG. 9 is a graph that illustrates the relationship which was observed in this example between the amount of kerosene [wt %] based on the total mass of kerosene and the mixture containing the ground powdery raw material and the dispersant in alcohol and the recovery amount [g/hr] of the fine particles produced by the process of the present invention.

The graph shown in FIG. 9 clearly indicates that use of kerosene upon production of fine particles increases the yield of fine particles in the present invention and, further, increasing the amount of kerosene [wt %] based on the total mass of the kerosene as a combustible solvent, the alcohol as a dispersion medium, the above-mentioned ground powdery raw material, and sorbitan fatty acid ester as a dispersant results in an increase in the recovery amount of fine particles.

The aluminum oxide fine particles formed as above had a particle size of 15 nm as calculated from the specific surface area (surface area per gram) thereof. The yield of the formed fine particles was about 50% of the amount of the powdery raw material used.

Example 2

An example of the second production mode using the fine particle producing apparatus 10 shown in FIG. 1 as mentioned above and also using a colloidal solution of a raw material is explained.

In this example, fine particles of aluminum oxide ($Al_2O_3$) were produced by the process for producing fine particles of the second production mode. A colloidal solution was prepared by a sol-gel method using an Al alkoxide as a raw material. Ethanol was used as a solvent and the same kerosene as that used in Example 1 (manufactured by Wako Pure Chemical Industries, Ltd., kerosine (Sp. Gr. 0.78 to 0.79)) was used as a combustible material. The kerosene addition amount was 15 [wt %] as the amount of kerosene [wt %] based on the total mass of the mixture containing the powdery raw material in ethanol.

The colloidal solution prepared by dispersing and mixing of the above-mentioned material for producing fine particles, solvent and combustible material was charged into the container 14b of the material supply unit 14 and stirred well with the stirrer 14c.

Subsequently, the process of Example 1 was followed to form fine particles. The driving conditions of the plasma torch and so on were made the same as those in Example 1.

The fine particles produced in this example had an average particle size of 15 nm.

Example 3

An example of the third production mode using the fine particle producing apparatus 10 shown in FIG. 1 as mentioned above and also using a solution prepared by dissolving a metal salt as a raw material in a solvent is explained.

In this example, fine particles of aluminum nitrate (Al($NO_3)_3$) were produced by the process for producing fine particles of the third production mode. First, aluminum nitrate as a metal salt was dissolved in water to prepare a 20 wt % aqueous solution of aluminum nitrate.

The same kerosene as that used in Example 1 (manufactured by Wako Pure Chemical Industries, Ltd., kerosine (Sp. Gr. 0.78 to 0.79)) was used as a combustible material. The kerosene addition amount was 15 [wt %] as the amount of kerosene [wt %] based on the total mass of the aqueous solution containing the powdery raw material.

The solution prepared by dissolving and mixing of the above-mentioned aqueous solution of the material for producing fine particles and the combustible material was charged into the container 14b of the material supply unit 14 shown in FIG. 1 and stirred well with the stirrer 14c.

Subsequently, the process of Example 1 was followed to form fine particles. The driving conditions of the plasma torch and so on were made the same as those in Example 1.

The fine particles produced in this example had an average particle size of 15 nm.

Example 4

An example of the fourth production mode using a fine particle producing apparatus obtained by substituting the material supply unit 140 shown in FIG. 3 for the material supply unit 14 in the fine particle producing apparatus 10 shown in FIG. 1 as mentioned above and also using a powdery raw material containing a combustible material as a raw material is explained.

In this example, fine particles of barium titanate ($BaTiO_3$), which are fine particles of higher oxide composed of a double oxide, namely two or more oxides, were produced by the process for producing fine particles of the fourth production mode. Note that the powdery raw material having a particle size of 10 μm or less was used so that barium titanate ($BaTiO_3$) could readily evaporate in a thermal plasma flame.

The same kerosene as that used in Example 1 (manufactured by Wako Pure Chemical Industries, Ltd., kerosine (Sp. Gr. 0.78 to 0.79)) was used as a combustible material. The kerosene addition amount was 15 [wt %] as the amount of kerosene [wt %] based on the total mass of the combustible material including the powdery raw material. Further, the driving conditions of the plasma torch and so on were made the same as those in Example 1.

The fine particles produced in this example had an average particle size of 15 nm.

Example 5

An example of the fifth production mode using the fine particle producing apparatus 110 of the second embodiment shown in FIG. 4 as mentioned above and also using a slurry of a raw material is explained in Example 5.

Fine particles of aluminum oxide ($Al_2O_3$) were produced by the fifth production mode of the process for producing fine particles according to the present invention.

First, the slurry 14a of a material for fine particles of aluminum oxide was prepared in a similar manner to that in Example 1. On this occasion, the amount of kerosene was set to 30 [wt %] based on the total mass of the mixture containing the kerosene as a combustible material, the powdery raw material and the dispersant in alcohol to prepare the slurry 14a.

In quite the same manner as that in Example 1, an argon-oxygen thermal plasma flame was generated in the plasma torch 12, with the driving conditions of the plasma torch and so on being made the same as those in Example 1. Further, the slurry of aluminum oxide ($Al_2O_3$) was introduced into the thermal plasma flame 24 in the plasma torch 12 together with argon gas as the spray gas in quite the same manner as that in Example 1.

Air was used as the gas to be introduced into the chamber 16 by the gas supply unit 28. On this occasion, the in-chamber flow rate of air was set to 5 m/sec and the introduction amount of air was set to 1 m³/min. Further, the above-mentioned angle α was 135° and the angle β was 0° when the air was ejected.

The aluminum oxide ($Al_2O_3$) fine particles formed as mentioned above had a particle size of 15 nm as calculated from the specific surface area (surface area per gram) thereof. The yield of the formed fine particles was 50% because the amount of the recovered fine particles was 50 g per 100 g of the powdery raw material used.

Example 6

An example of the sixth production mode using the fine particle producing apparatus 110 shown in FIG. 4 as mentioned above and also using a colloidal solution of a raw material is explained in Example 6.

In this example, fine particles of aluminum oxide ($Al_2O_3$) were produced by the process for producing fine particles of the sixth production mode.

First, a colloidal solution was prepared by dispersing and mixing of the material for producing fine particles (Al alkoxide), the solvent (ethanol), and the combustible material (kerosene) in quite the same manner as that in Example 2.

The colloidal solution thus prepared was charged into the container 14b of the material supply unit 14 shown in FIG. 4 and stirred well with the stirrer 14c.

Subsequently, the process of Example 5 was followed to form fine particles. The driving conditions of the plasma torch 12 and so on were made the same as those in Example 5. The introduction amount and ejection conditions of the gas introduced into the chamber 16 by the gas supply unit 28 were the same as those in Example 5.

The fine particles produced in this example had an average particle size of 15 nm. The yield of the formed fine particles was 55% because the amount of the recovered fine particles was 55 g per 100 g of the powdery raw material used.

Example 7

An example of the seventh production mode using the fine particle producing apparatus 110 shown in FIG. 4 as mentioned above and also using a solution prepared by dissolving a metal salt as a raw material in a solvent is explained.

In this example, fine particles of aluminum oxide ($Al_2O_3$) were produced by the process for producing fine particles of the seventh production mode.

First, a kerosene-added 20 wt % solution of aluminum nitrate as a material for fine particles of aluminum oxide was prepared in quite the same manner as in that in Example 3.

Also in quite the same manner as that in Example 3, the argon-oxygen thermal plasma flame 24 was generated in the plasma torch 12, with the driving conditions of the plasma torch 12 and so on being made the same as those in Example 3. Further, in quite the same manner as that in Example 3, the kerosene-added 20 wt % solution of aluminum nitrate as the raw material together with argon gas as the spray gas was supplied into the thermal plasma flame 24 in the plasma torch 12.

The introduction amount and ejection conditions of the gas introduced into the chamber 16 by the gas supply unit 28 were the same as those in Example 5.

The fine particles of aluminum oxide thus formed had a particle size of 10 nm as calculated from the specific surface area thereof. The yield of the formed fine particles was 17% because the amount of the recovered fine particles was 17 g per 100 g of the powdery raw material used.

Example 8

An example of the eighth production mode using a fine particle producing apparatus obtained by substituting the material supply unit 140 shown in FIG. 3 for the material supply unit 14 in the fine particle producing apparatus 110 shown in FIG. 4 as mentioned above and also using a powdery raw material as such as a raw material is explained in Example 8.

In this example, fine particles of barium titanate ($BaTiO_3$), which are fine particles of higher oxide composed of a double oxide, namely two or more oxides, were produced by the process for producing fine particles of the eighth production mode.

In this example, similar to Example 4 as above, the powdery raw material having a particle size of 10 μm or less was used so that barium titanate ($BaTiO_3$) could readily evaporate in the thermal plasma flame 24.

In quite the same manner as that in Example 4, the argon-oxygen thermal plasma flame 24 was generated in the plasma torch 12, with the driving conditions of the plasma torch 12 and so on being made the same as those in Example 4. Further, in quite the same manner as that in Example 4, barium titanate ($BaTiO_3$) as the powdery raw material together with argon gas as the spray gas was introduced into the thermal plasma flame 24 in the plasma torch 12.

The introduction amount and ejection conditions of the gas introduced into the chamber 16 by the gas supply unit 28 were the same as those in Example 5.

The fine particles of barium titanate thus formed had a particle size of 20 nm as calculated from the specific surface area thereof. The yield of the formed fine particles was 80% because the amount of the recovered fine particles was 80 g per 100 g of the powdery raw material used.

Example 9

An example of the ninth production mode which uses the fine particle producing apparatus 120 of the third embodiment shown in FIG. 7 as mentioned above and makes a powdery raw material into the form of a slurry is explained in Example 9.

Fine particles of aluminum oxide ($Al_2O_3$) were produced by the ninth production mode of the process for producing fine particles according to the present invention.

In this example, first, the slurry 14a of a material for fine particles of aluminum oxide was prepared in the same manner as that in Example 5.

Also in quite the same manner as that in Example 5, an argon-oxygen thermal plasma flame was generated in the plasma torch 12, with the driving conditions of the plasma torch and so on being made the same as those in Example 5. Further, in the same manner as that in Example 5, the slurry of aluminum oxide ($Al_2O_3$) together with argon gas as the spray gas was introduced into the thermal plasma flame 24 in the plasma torch 12.

Air was used as the gas to be introduced into the chamber 16 by the gas supply unit 28 similarly to Example 5. On this occasion, the in-chamber flow rate of air was also set to 5 m/sec and the introduction amount of air was set to 1 m³/min.

The pressure in the cyclone 19 was set to 50 kPa and the supply rate of fine particles from the chamber 16 to the cyclone 19 was set to 10 m/s (average value).

The fine particles of aluminum oxide ($Al_2O_3$) thus formed had a particle size of 15 nm as calculated from the specific surface area (surface area per gram) thereof. The yield of the formed fine particles was 50% because the amount of the recovered fine particles was 50 g per 100 g of the powdery raw material supplied.

Example 10

An example of the tenth production mode which uses the fine particle producing apparatus 120 shown in FIG. 7 as mentioned above and forms fine particles starting from a colloidal solution is explained in Example 10.

In this example, fine particles of aluminum oxide ($Al_2O_3$) were produced by the process for producing fine particles of the tenth production mode.

First, a colloidal solution was prepared by dispersing and mixing of the material for producing fine particles (Al alkoxide), the solvent (ethanol), and the combustible material (kerosene) in quite the same manner as that in Example 6.

The colloidal solution thus prepared was charged into the container 14b of the material supply unit 14 and stirred well with the stirrer 14c.

Subsequently, the process of Example 6 was followed to form fine particles. The driving conditions of the plasma torch 12 and so on were made the same as those in Example 6. The supply amount and ejection conditions of the gas supplied into the chamber 16 by the gas supply unit 28 were the same as those in Example 9. The pressure in the cyclone 19 and the supply rate of fine particles from the chamber 16 to the cyclone 19 were also the same as those in Example 9.

The fine particles produced in this example had an average particle size of 15 nm. The yield of the formed fine particles was 55% because the amount of the recovered fine particles was 55 g per 100 g of the powdery raw material supplied.

Example 11

An example of the eleventh production mode using the fine particle producing apparatus 120 shown in FIG. 7 as mentioned above and also using a solution prepared by dissolving a metal salt as a powdery raw material in a solvent is explained in Example 11.

In this example, fine particles of aluminum oxide ($Al_2O_3$) were produced by the process for producing fine particles of the eleventh production mode.

First, a kerosene-added 20 wt % solution of aluminum nitrate as a material for fine particles of aluminum oxide was prepared in quite the same manner as that in Example 7.

Also in quite the same manner as that in Example 7, the argon-oxygen thermal plasma flame 24 was generated in the plasma torch 12, with the driving conditions of the plasma torch 12 and so on being made the same as those in Example 7. Further, in quite the same manner as that in Example 7, the kerosene-added 20 wt % solution of aluminum nitrate as the raw material together with argon gas as the spray gas was supplied into the thermal plasma flame 24 in the plasma torch 12.

The supply amount and ejection conditions of the gas supplied into the chamber 16 by the gas supply unit 28 were the same as those in Example 9. The pressure in the cyclone 19 and the supply rate of fine particles from the chamber 16 to the cyclone 19 were also the same as those in Example 9.

The fine particles of aluminum oxide thus formed had a particle size of 10 nm as calculated from the specific surface area thereof. The yield of the formed fine particles was 17% because the amount of the recovered fine particles was 17 g per 100 g of the powdery raw material supplied.

Example 12

An example of the twelfth production mode using a fine particle producing apparatus obtained by substituting the material supply unit 140 shown in FIG. 3 for the material supply unit 14 in the fine particle producing apparatus 120 shown in FIG. 7 as mentioned above and also using a powdery raw material as such is explained in Example 12.

In this example, fine particles of barium titanate ($BaTiO_3$), which are fine particles of higher oxide composed of a double oxide, namely two or more oxides, were produced by the process for producing fine particles of the twelfth production mode.

In this example, similar to Example 8 as above, the powdery raw material having a particle size of 10 μm or less was used so that barium titanate ($BaTiO_3$) could readily evaporate in the thermal plasma flame 24.

In quite the same manner as that in Example 8, the argon-oxygen thermal plasma flame 24 was generated in the plasma torch 12, with the driving conditions of the plasma torch 12 and so on being made the same as those in Example 8. Further, in quite the same manner as that in Example 4, barium titanate ($BaTiO_3$) as the powdery raw material together with argon gas as the spray gas was supplied into the thermal plasma flame 24 in the plasma torch 12.

The supply amount and ejection conditions of the gas supplied into the chamber 16 by the gas supply unit 28 were the same as those in Example 9. The pressure in the cyclone 19 and the supply rate of fine particles from the chamber 16 to the cyclone 19 were also the same as those in Example 9.

The fine particles of barium titanate thus formed had a particle size of 20 nm as calculated from the specific surface area thereof. The yield of the formed fine particles was 80% because the amount of the recovered fine particles was 80 g per 100 g of the powder material supplied.

The results of Examples 1 to 12 demonstrate the effects of the processes for producing fine particles according to the first to third aspects of the present invention and of the fine particle producing apparatuses according to the fourth and fifth aspects of the present invention.

In Examples 1, 5, and 9, fine particles can similarly be produced by using as a powdery raw material titanium oxide, zirconium oxide, calcium oxide, silicon oxide, silver oxide, iron oxide, magnesium oxide, manganese oxide, yttrium oxide, cerium oxide, samarium oxide, beryllium oxide, vanadium oxide, chromium oxide, barium oxide or the like instead of aluminum oxide.

Further, in Examples 1, 5, and 9, examples of preparing a slurry using a dispersant and a combustible material as well as a powder material were shown. As described before, such examples may include those examples in which the order of addition of the dispersant and the combustible material is changed, those examples in which only the dispersant is added to the powder material, and those examples in which only the combustible material is added to the powder material.

In Examples 2, 6, and 10, examples of adding a dispersant and a combustible material to the colloidal solution were shown. As described before, such examples may include those examples in which the order of addition of the dispersant and the combustible material is changed, those examples in which only the dispersant is added to the colloidal solution, and those examples in which only the combustible material is added to the colloidal solution.

In Examples 3, 7, and 11, acetates, chlorides, hydroxides, oxalates, carbonates, or ammonium salts may be used as the metal salt.

Also, in Examples 3, 7, and 11, examples in each of which a solution was prepared by adding a dispersant and a combustible material to a powder material were shown. As mentioned above, such examples may include those examples in which the order of addition of the dispersant and the combustible material is changed, those examples in which only the dispersant is added to the powder material, and those examples in which only the combustible material is added to the powder material.

In Examples 4, 8, and 12, examples in each of which a powder material together with argon gas as a spray gas was supplied into a thermal plasma flame were shown. As mentioned above, such examples may include those examples in which a combustible material is added as appropriate.

The invention claimed is:

1. A process for producing fine particles, comprising the steps of:
    introducing a material for producing the fine particles into a thermal plasma flame to make a vapor-phase mixture; and
    quenching the vapor-phase mixture to form the fine particles,
    wherein said step of introducing the material for producing the fine particles into the thermal plasma flame comprises the steps of:
    dispersing or dissolving the material for producing the fine particles in a dispersion medium or solvent containing a combustible material to prepare a dispersion; and
    making the dispersion into a form of droplets so as to introduce the dispersion in a droplet form into the thermal plasma flame, or dispersing the material for producing the fine particles with a carrier gas and a combustible material and introducing the dispersed material for producing the fine particles into the thermal plasma flame.

2. A process for producing fine particles, comprising the steps of:
    introducing a material for producing, the fine particles into a thermal plasma flame to make a vapor-phase mixture; and
    quenching the vapor-phase mixture to form the fine particles,
    wherein said step of introducing the material for producing the fine particles into the thermal plasma flame comprises the steps of:
    dissolving the material for producing the fine particles in a solvent to prepare a solution; and
    making the solution into a form of droplets so as to introduce the solution in a droplet form into the thermal plasma flame.

3. A process for producing fine particles, comprising the steps of:
    introducing a material for producing the fine particles into a thermal plasma flame to make a vapor-phase mixture; and
    supplying a gas of an amount sufficient to quench the vapor-phase mixture toward a tail of the thermal plasma flame to form the fine particles.

4. A process for producing fine particles, comprising the steps of:
    introducing primary fine particles formed by a predetermined treatment into at least one cyclone to subject the primary fine particles to cooling and classification based on a predetermined particle size;
    removing coarse particles having a particle size equal to or greater than the predetermined particle size by the classification; and
    recovering secondary fine particles having a particle size of 100 nm or less which are left upon removal of the coarse particles;
    wherein the treatment for forming the primary fine particles is a treatment in which a material for producing the fine particles is dispersed and then introduced into a thermal plasma flame so as to evaporate the material for producing the fine particles to make a vapor-phase mixture.

5. The process for producing fine particles according to claim 4, wherein, in the treatment for forming the primary fine particles, after the material for producing the fine particles is evaporated to make the vapor-phase mixture, a gas for quenching the vapor-phase mixture is supplied toward a tail of the thermal plasma flame in an amount of from 200% to 5,000% of an amount of the gas introduced into the thermal plasma flame.

6. The process for producing fine particles according to claim 3 wherein the step of introducing the material for producing the fine particles into the thermal plasma flame comprises the steps of:
    dispersing the material for producing the fine particles in a dispersion medium to prepare a slurry;
    making the slurry into the form of droplets; and
    introducing the slurry in the droplet form into the thermal plasma flame.

7. The process for producing fine particles according to claim 1, wherein the step of introducing the material for producing the fine particles into the thermal plasma flame comprises the steps of:
    dispersing the material for producing the fine particles in a combustible material to prepare a slurry;
    making the slurry into the form of droplets; and
    introducing the slurry in the droplet form into the thermal plasma flame.

8. The process for producing fine particles according to claim 1, wherein the step of introducing the material for producing the fine particles into the thermal plasma flame comprises the steps of:
    dispersing the material for producing the fine particles using a dispersion medium and a combustible material to prepare a slurry;
    making the slurry into the form of droplets; and
    introducing the slurry in the droplet form into the thermal plasma flame.

9. The process for producing fine particles according to claim 1, wherein the step of introducing the material for producing the fine particles into the thermal plasma flame comprises the steps of:
    dispersing the material for producing the fine particles in a dispersion medium, and then adding thereto a combustible material to prepare a slurry;
    making the slurry into the form of droplets; and
    introducing the slurry in the droplet form into the thermal plasma flame.

10. The process for producing fine particles according to claim 2, wherein the step of introducing the material for producing the fine particles into the thermal plasma flame comprises the steps of:
    suspending the material for producing the fine particles in a dispersion medium to prepare a colloidal solution;
    making, the colloidal solution into the form of droplets; and
    introducing the colloidal solution in the droplet limn into the thermal plasma flame.

11. The process for producing fine particles according to claim 1, wherein the step of introducing the material for producing the fine particles into the thermal plasma flame comprises the steps of:
   suspending the material for producing the fine particles in a combustible material to prepare a colloidal solution;
   making the colloidal solution into the form of droplets; and
   introducing the colloidal solution in the droplet form into the thermal plasma flame.

12. The process for producing fine particles according to claim 1, wherein the step of introducing the material for producing the fine particles into the thermal plasma flame comprises the steps of:
   suspending the material for producing the fine particles in a dispersion medium and a combustible material to prepare a colloidal solution;
   making the colloidal solution into the form of droplets; and
   introducing the colloidal solution in the droplet form into the thermal plasma flame.

13. The process for producing fine particles according to claim 1, wherein the step of introducing the material for producing the fine particles into the thermal plasma flame comprises the steps of:
   suspending the material for producing the fine particles in a dispersion medium, and then adding a combustible material to prepare a colloidal solution;
   making the colloidal solution into the form of droplets; and
   introducing the colloidal solution in the droplet form into the thermal plasma flame.

14. The process for producing fine particles according to claim 2, wherein the step of introducing the material for producing the fine particles into the thermal plasma flame comprises the steps of:
   dissolving the material for producing the fine particles in a solvent to prepare dissolution solution;
   making the dissolution solution into the form of droplets; and
   introducing the dissolution solution in the droplet form into the thermal plasma flame.

15. The process for producing fine particles according to claim 1, wherein the step of introducing the material for producing the fine particles into the thermal plasma flame comprises the steps of:
   dissolving the material for producing the fine particles using a combustible material to prepare a dissolution solution;
   making the dissolution solution into the form of droplets; and
   introducing the dissolution solution in the droplet form into the thermal plasma flame.

16. The process for producing fine particles according to claim 1, wherein the step of introducing the material for producing the fine particles into the thermal plasma flame comprises the steps of:
   dissolving the material for producing the fine particles using a solvent and a combustible material to prepare a dissolution solution;
   making the dissolution solution into the form of droplets; and
   introducing the dissolution solution in the droplet form into the thermal plasma flame.

17. The process for producing fine particles according to claim 1, wherein the step of introducing the material for producing the fine particles into the thermal plasma flame comprises the steps of:
   dissolving the material for producing the fine particles in a solvent, and then adding a combustible material to prepare a dissolution solution;
   making the dissolution solution into the form of droplets; and
   introducing the dissolution solution in the droplet form into the thermal plasma flame.

18. The process for producing fine particles according to claim 3, wherein the step of introducing the material for producing the fine particles into the thermal plasma flame comprises the steps of:
   dispersing the material for producing the fine particles using a carrier gas; and
   introducing the dispersed material for producing the fine particles into the thermal plasma flame.

19. The process for producing fine particles according to claim 1, wherein the step of introducing the material for producing the fine particles into the thermal plasma flame comprises the steps of:
   dispersing the material for producing the fine particles using a carrier gas and a combustible material; and
   introducing the dispersed material for producing the fine particles into the thermal plasma flame.

20. The process for producing fine particles according to claim 1, wherein the combustible material has an action of stabilizing the thermal plasma flame.

21. The process for producing fine particles according to claim 6, wherein one or more substances selected from the group consisting of a surfactant, a high polymer, and a coupling agent are added singly or in admixture to the slurry.

22. The process for producing fine particles according to claim 10, wherein one or more substances selected from the group consisting of a surfactant, a high polymer, and a coupling agent are added singly or in admixture to the colloidal solution.

23. The process for producing fine particles according to claim 14, wherein one or more substances selected from the group consisting of a surfactant, a high polymer, and a coupling agent are added singly or in admixture to the dissolution solution.

24. The process for producing fine particles according to claim 18, wherein one or more substances selected from the group consisting of a surfactant, a high polymer, and a coupling agent are added singly or in admixture to the dispersed material for producing the fine particles.

25. The process for producing fine particles according to claim 1, wherein components that constitute the material for producing the fine particles are simple oxides, composite oxides, double oxides, oxide solid solutions, metals, alloys, hydroxides, carbonate compounds, halides, sulfides, nitrides, carbides, hydrides, metal salts or organometallic compounds that contain at least one element selected from the group consisting of the elements having atomic numbers of 3 to 6, 11 to 15, 19 to 34, 37 to 52, 55 to 60, 62 to 79, and 81 to 83.

26. A fine particle producing apparatus, comprising:
   a material supplying section that disperses a material for producing fine particles and supplies the dispersed material into a thermal plasma flame;
   a plasma torch connected to said material supplying section that generates said thermal plasma flame so as to evaporate the material for producing the fine particles to make a vapor-phase mixture;
   a cooling chamber connected to said plasma torch that provides a space necessary to quench said vapor-phase mixture; and a gas supplying section that supplies a as of an amount sufficient to quench the vapor-phase mixture toward a tail of said thermal plasma flame.

27. A fine particle producing apparatus, comprising:

a material supplying section that disperses a material for producing fine particles and supplies the dispersed material into a thermal plasma flame;

a plasma torch connected to said material supplying section that generates said thermal plasma flame so as to evaporate the material for producing the fine particles to make a vapor-phase mixture;

a cooling chamber connected to said plasma torch that provides a space necessary to quench the vapor-phase mixture; and at least one cyclone as a classifying section into which primary fine particles formed by quenching the vapor-phase mixture are introduced.

28. The fine particle producing apparatus according to claim 27, further comprising: a gas supplying section that supplies a gas of an amount sufficient to quench the vapor-phase mixture toward a tail of said thermal plasma flame.

29. The fine particle producing apparatus according to claim 26, wherein said material supplying section comprises:

a material preparing section that disperses the material, for producing the fine particles to prepare a shiny and stores the slurry thus prepared; and a spray section that is connected to said material preparing section, and that sprays the slurry into said thermal plasma flame inside said plasma torch.

30. The line particle producing apparatus according to claim 26, wherein said material supplying section comprises:

a material preparing section that suspends the material for producing the fine particles or subjects a solution of material for producing the fine particles to a chemical reaction to prepare a colloidal solution and stores the colloidal solution thus prepared; and a spray section that is connected to said material preparing section, and that sprays the colloidal solution into said thermal plasma flame inside said plasma torch.

31. The fine particle producing apparatus according to claim 26, wherein said material supplying section comprises:

a material preparing section that dissolves the material for producing the fine particles to prepare a dissolution solution and stores the dissolution solution thus prepared; and a spray section connected to said material preparing section that sprays the dissolution solution into said thermal plasma flame inside said plasma torch.

32. The fine particle producing apparatus according to claim 26, wherein said material supplying section comprises:

a powder material supplying section that delivers a powder material as the material for producing the fine particles from a section for its storage; and a section for transportation by gas connected to the powder material supplying section that disperses the powder material with a carrier gas and supplies the dispersed material into said thermal plasma flame inside said plasma torch.

* * * * *